United States Patent
Kanai

(10) Patent No.: US 9,811,274 B2
(45) Date of Patent: Nov. 7, 2017

(54) STORAGE CONTROL APPARATUS AND COPY CONTROL METHOD

(71) Applicant: FUJITSU LIMITED, Kawasaki-shi, Kanagawa (JP)

(72) Inventor: Hideyuki Kanai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 14/793,777

(22) Filed: Jul. 8, 2015

(65) Prior Publication Data
US 2016/0041779 A1 Feb. 11, 2016

(30) Foreign Application Priority Data
Aug. 6, 2014 (JP) .................................. 2014-159980

(51) Int. Cl.
G06F 3/06 (2006.01)
G06F 11/10 (2006.01)

(52) U.S. Cl.
CPC ............ *G06F 3/0619* (2013.01); *G06F 3/065* (2013.01); *G06F 3/067* (2013.01); *G06F 11/10* (2013.01); *G06F 3/0656* (2013.01)

(58) Field of Classification Search
None
See application file for complete search history.

(56) References Cited

U.S. PATENT DOCUMENTS

| | | | | |
|---|---|---|---|---|
| 5,379,412 A * | 1/1995 | Eastridge | ............ | G06F 11/1466 711/162 |
| 6,397,351 B1 * | 5/2002 | Miller | ................. | G06F 11/1469 714/13 |
| 7,401,093 B1 * | 7/2008 | Hamilton | .......... | G06F 17/30088 |
| 2002/0178336 A1 * | 11/2002 | Fujimoto | .............. | G06F 3/0611 711/165 |
| 2007/0011361 A1 | 1/2007 | Okada et al. | | |
| 2009/0204774 A1 * | 8/2009 | Matsui | ................ | G06F 11/2064 711/162 |
| 2009/0300304 A1 * | 12/2009 | Boyd | ................ | G06F 17/30575 711/162 |
| 2010/0030986 A1 * | 2/2010 | Shinozaki | ............. | G06F 3/0613 711/162 |
| 2011/0185222 A1 | 7/2011 | Min | | |

FOREIGN PATENT DOCUMENTS

| | | |
|---|---|---|
| JP | 2007-018236 | 1/2007 |
| JP | 2007-140651 | 6/2007 |
| JP | 2011-150602 | 8/2011 |

* cited by examiner

*Primary Examiner* — Charles Rones
*Assistant Examiner* — Hewy Li
(74) *Attorney, Agent, or Firm* — Fujitsu Patent Center

(57) ABSTRACT

When the capacity of a buffer region runs short, storing a first generation data set, a second generation data set, and a third generation data set, a control unit selects the first generation data set as a designated data set. The control unit creates, and stores in a storage unit, update record information based on the first generation data set. The control unit identifies the position where the first generation data set is to be stored in the copy source volume according to correspondence relation information, and updates the copy source volume with the first generation data set. The control unit deletes the first generation data set from the buffer region, and also deletes the correspondence relation information corresponding to the first generation data set from the storage unit.

8 Claims, 21 Drawing Sheets

301 INDEX TABLE

| LUN : LBA | BUFFER ADDRESS |
|---|---|
| 0x00:0x100 | 0x1000 |
| 0x00:0x200 | 0x3000 |
| 0x01:0x300 | 0x4000 |
| 0x00:0x400 | 0x6000 |

FIG. 8

302 INDEX TABLE

| LUN : LBA | BUFFER ADDRESS |
|---|---|
| 0x00:0x100 | 0x7000 |
| 0x00:0x200 | 0x3000 |
| 0x01:0x300 | 0x4000 |
| 0x00:0x400 | 0x6000 |

FIG. 10

303 INDEX TABLE

| LUN : LBA | BUFFER ADDRESS |
|---|---|
| 0x00:0x100 | 0x7000 |
| — | — |
| 0x01:0x300 | 0x4000 |
| 0x00:0x400 | 0x6000 |

FIG. 13

STORAGE CONTROL APPARATUS AND COPY CONTROL METHOD

CROSS-REFERENCE TO RELATED APPLICATION

This application is based upon and claims the benefit of priority of the prior Japanese Patent Application No. 2014-159980, filed on Aug. 6, 2014, the entire contents of which are incorporated herein by reference.

FIELD

The embodiments discussed herein relate to a storage control apparatus and a copy control method.

BACKGROUND

There is known a technique referred to as remote copy, which transfers data in a volume being the copy source to a storage apparatus located at a remote site as the copy destination, such remote copy being used for disaster countermeasure, for example. In addition, there is a technique referred to as order-guaranteed remote copy, which copies data to the copy destination volume while maintaining the order of data update in the copy source volume.

The order-guaranteed remote copy stores, in the copy source buffer, data whose copy source volume has been updated, and transfers data from the copy source buffer to the copy destination volume in the order of updates. On this occasion, updating the copy source volume may cause exhaustion of copy source buffers when communication between storage apparatuses is disabled by network failure or the like.

The copy source storage apparatus creates a bit string corresponding to the update area in the copy source volume, from data stored in the copy source buffer, and subsequently uses the bit string to manage updates performed on the copy source volume until normal operation is resumed. The bit string is information on whether an update has been made for each predetermined area in the copy source volume, and does not include information relating to the order of updates. The remote copy therefore turns into an order-unguaranteed state until normal operation is resumed.

There have been attempts to suppress exhaustion of copy source buffers to prevent falling into an order-unguaranteed state.

Japanese Laid-open Patent Publication No. 2007-140651
Japanese Laid-open Patent Publication No. 2011-150602
Japanese Laid-open Patent Publication No. 2007-18236

However, once exhaustion of copy source buffers occurs, a bit string corresponding to the update area in the copy source volume is created and the copy source buffer is cleared. Data to be transferred corresponding to the bit string which has been created in the above manner grows to a size corresponding to a size of the copy source buffer and takes a long time to be transferred.

With such remote copy, the order-unguaranteed state continues for a long time due to exhaustion of copy source buffers and therefore it is desired to resume to the order-guaranteed state as soon as possible.

SUMMARY

According to an aspect, there is provided a storage control apparatus capable of performing remote copy with a first storage apparatus being a copy source and a second storage apparatus being a copy destination, the second storage apparatus being connected to the first storage apparatus via a network. The storage control apparatus includes: a memory having a buffer region that stores, for each update generation, a data set for updating a copy source volume included in the first storage apparatus; and a processor that performs a procedure including: storing, upon receiving a data set for updating the copy source volume, the data set in the buffer region, and storing, in the memory, correspondence relation information indicating a correspondence relation between a position where the data set is to be stored in the copy source volume and a position where the data set is stored in the buffer region; and when transferring a data set from the first storage apparatus to the second storage apparatus, selecting a data set of an old update generation to be transferred among data sets stored in the buffer region, updating the copy source volume with the data set of the old update generation, deleting the data set of the old update generation from the buffer region, and also deleting correspondence relation information corresponding to the data set of the old update generation from the memory; and when a capacity of the buffer region runs short, creating and storing in the memory, update record information indicating whether an update has been made for each predetermined area in the copy source volume based on a predetermined data set of an old update generation stored in the buffer region, updating the copy source volume with the predetermined data set of the old update generation according to the correspondence relation information, deleting the predetermined data set of the old update generation from the buffer region, also deleting correspondence relation information corresponding to the predetermined data set of the old update generation from the memory, and transferring the data set stored in the copy source volume to the second storage apparatus, based on the update record information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an exemplary index table of the second embodiment;

FIG. 10 illustrates an exemplary update of an index table based on reception of a write I/O in the second embodiment;

FIG. 13 illustrates an exemplary deletion of an entry corresponding to a transfer data set from an index table in the second embodiment;

DESCRIPTION OF EMBODIMENTS

Figure 1:
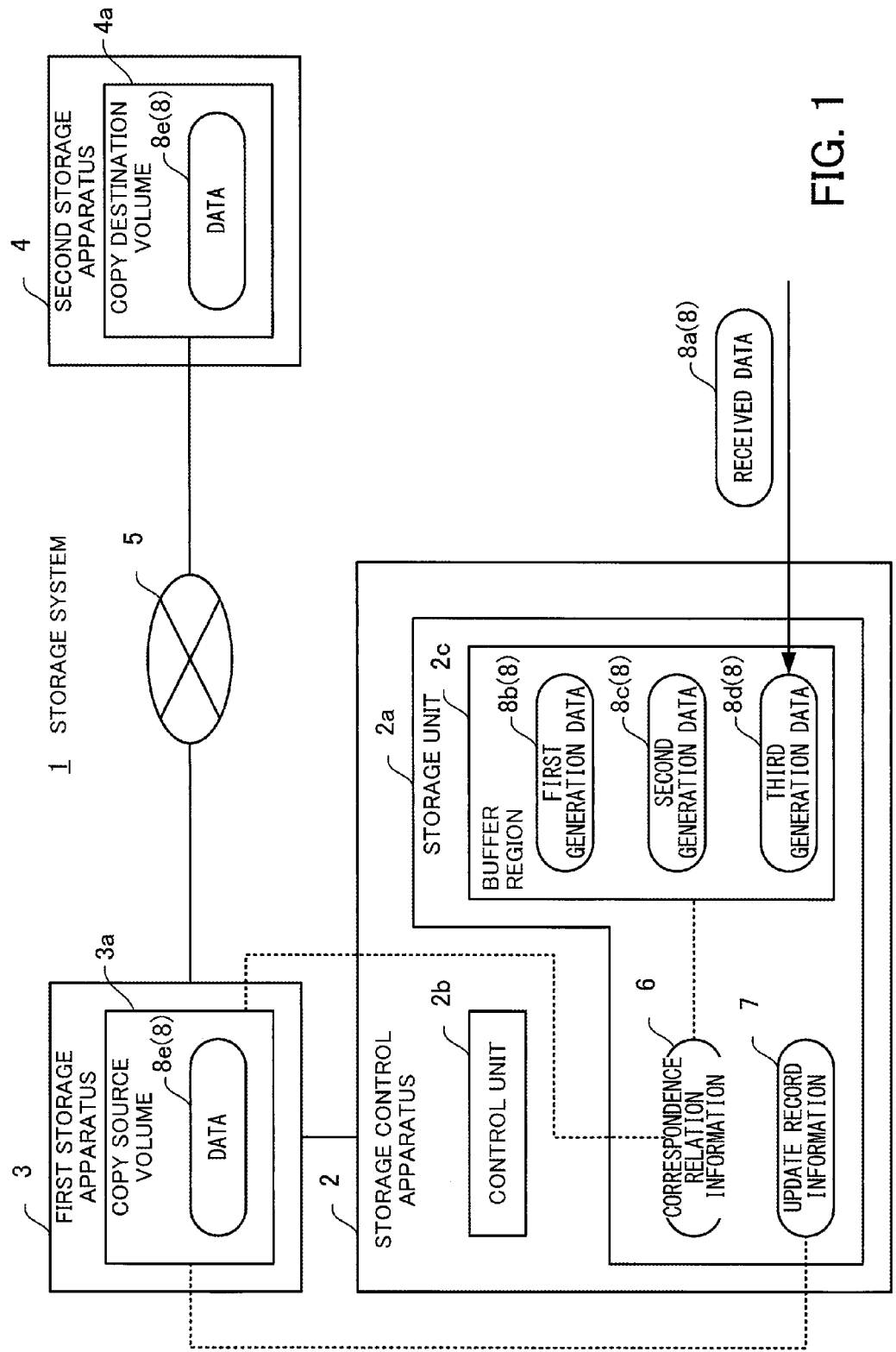
FIG. 1 illustrates an exemplary configuration of a storage system of a first embodiment.

Several embodiments will be described below with reference to the accompanying drawings, wherein like reference numerals refer to like elements throughout.

First Embodiment

First, a storage system of a first embodiment will be described, referring to FIG. 1. FIG. 1 illustrates an exemplary configuration of the storage system of the first embodiment.

A storage system 1 includes a storage control apparatus 2, a first storage apparatus 3, and a second storage apparatus 4 connected to the first storage apparatus 3 via a network 5. The storage control apparatus 2 is an information processing apparatus that is installed integrally with or separate from the first storage apparatus 3 and is configured to control the first storage apparatus 3. The first storage apparatus 3 is capable of storing data in a copy source volume 3a, and the second storage apparatus 4 is capable of storing data in a copy destination volume 4a. The storage control apparatus 2 is capable of performing remote copy with the first storage apparatus 3 being the copy source and the second storage apparatus 4 being the copy destination.

The storage control apparatus 2 includes a storage unit 2a and a control unit 2b. The storage unit 2a has a buffer region 2c having a predetermined capacity. The buffer region 2c stores a data set for updating the copy source volume 3a for each update generation. For example, the buffer region 2c stores a first generation data set 8b, a second generation data set 8c, and a third generation data set 8d in chronological order of update generations.

The control unit 2b receives a data set for updating the copy source volume 3a from an unillustrated host computer, for example, as a write I/O (Input/Output). The control unit 2b stores the received data set in the buffer region 2c as a data set of the latest update generation. The control unit 2b stores correspondence relation information 6 in the storage unit 2a. The correspondence relation information 6 indicates the correspondence relation between a position where a data set 8 is stored in the copy source volume 3a and a position where the data set 8 is stored in the buffer region 2c. The position where the data set 8 is stored in the copy source volume 3a indicates a storage area to be updated by the received data set 8. At this point of time, the received data set is stored in the buffer region 2c, but is not stored in the copy source volume 3a. In other words, the copy source volume 3a stores a data set yet to be updated with the data set 8 in an area in which the data set 8 is to be stored.

When transferring a data set from the first storage apparatus 3 to the second storage apparatus 4, the control unit 2b selects a data set of an old update generation to be transferred, among the data sets stored in the buffer region 2c. The control unit 2b updates the copy source volume 3a with the data set of the old update generation which has been selected to be transferred (data to be transferred). The data set received by the storage control apparatus 2 is stored at this point of time, by the copy source volume 3a. The control unit 2b deletes the data to be transferred from the buffer region 2c, and also deletes the correspondence relation information 6 corresponding to the data to be transferred from the storage unit 2a.

When the capacity of the buffer region 2c runs short, the control unit 2b creates, and stores in the storage unit 2a, update record information 7 based on a predetermined data set of an old update generation (designated data set) stored in the buffer region 2c. The control unit 2b selects a range in which data sets are designated for respective generations (e.g., two update generations). The update record information 7 is information indicating whether an update has been made for each predetermined area in the copy source volume 3a, expressed as a bit string or a bit map, a single bit of which indicates, for example, whether an update has been made to a predetermined area.

The control unit 2b updates the copy source volume 3a with the designated data set according to the correspondence relation information 6. The control unit 2b deletes the designated data set from the buffer region 2c, and also deletes the correspondence relation information 6 corresponding to the designated data set from the storage unit 2a. The control unit 2b transfers a data set stored in the copy source volume 3a, to the second storage apparatus 4, based on the update record information 7.

Accordingly, the storage control apparatus 2 may secure a free capacity of the buffer region 2c by deletion of the designated data set. In addition, the storage control apparatus 2, being capable of suppressing the amount of data to be transferred based on the update record information 7, may recover more quickly from the order-unguaranteed state in remote copy to the order-guaranteed state.

The aforementioned process will be described, referring to an example. For example, the control unit 2b receives an update data set for the copy source volume 3a as a received data set 8a according to a write I/O from the host computer and, when the first generation data set 8b and the second generation data set 8c have already been stored, stores the received data set 8a in the buffer region 2c as the third generation data set 8d of the latest update generation. The control unit 2b stores, in the storage unit 2a as the correspondence relation information 6, the correspondence relation between a storage area to be updated in the copy source volume 3a and a storage area in the buffer region 2c of the third generation data set 8d.

When the buffer region 2c stores the first generation data set 8b, the second generation data set 8c, and the third generation data set 8d, the control unit 2b selects the first generation data set 8b of an old update generation to be transferred. The control unit 2b updates the copy source volume 3a with the first generation data set 8b, deletes the first generation data set 8b from the buffer region 2c, and also deletes the correspondence relation information 6 corresponding to the first generation data set 8b from the storage unit 2a.

When the capacity of the buffer region 2c runs short, storing the first generation data set 8b, the second generation data set 8c, and the third generation data set 8d, the control unit 2b selects the first generation data set 8b as the designated data set. The control unit 2b creates, and stores in the storage unit 2a, the update record information 7 based on the first generation data set 8b. The control unit 2b identifies the position where the first generation data set 8b is stored in the copy source volume 3a according to the correspondence relation information 6, and updates the copy source volume 3a with the first generation data set 8b. The control unit 2b deletes the first generation data set 8b from the buffer region 2c, and also deletes the correspondence relation information 6 corresponding to the first generation data set 8b from the storage unit 2a. Accordingly, the buffer region 2c may secure the capacity corresponding to the amount of the first generation data set 8b, and store additional received data sets in the buffer region 2c. The control unit 2b identifies the yet-to-be-transferred data set 8e based on the update record information 7, and transfers the data set 8e stored in the copy source volume 3a to the second storage apparatus 4.

Second Embodiment

Figure 2:
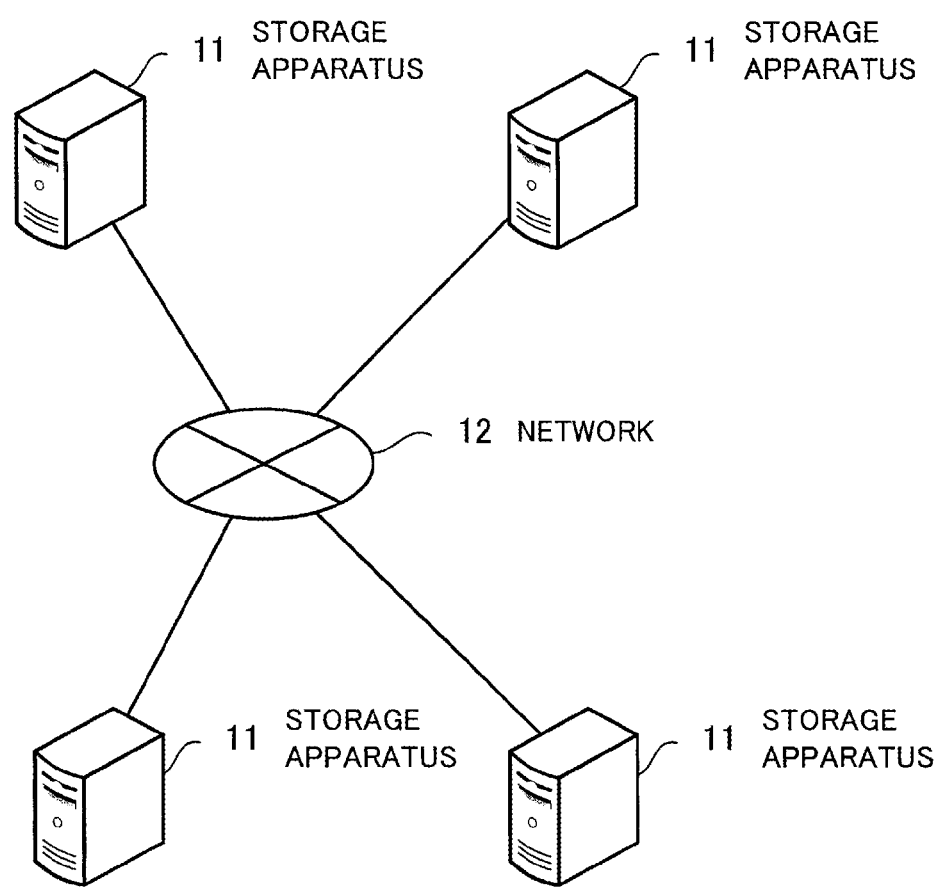
FIG. 2 illustrates an exemplary configuration of a storage system of a second embodiment.

Next, a storage system of a second embodiment will be described, referring to FIG. 2. FIG. 2 illustrates an exemplary configuration of the storage system of the second embodiment.

A storage system 10 includes a plurality of storage apparatuses 11 and a network 12 connecting the plurality of storage apparatuses 11. The storage system 10 is capable of performing remote copy with one of the storage apparatuses 11 being a copy source (copy source storage apparatus), and the other storage apparatuses 11 being copy destinations (copy destination storage apparatuses). The storage system 10 is capable of performing remote copy from a plurality of copy source storage apparatuses to a single copy destination storage apparatus by creating a copy session between the copy source storage apparatuses and the copy destination storage apparatus. In addition, the storage system 10 allows a single copy source storage apparatus to perform remote copy to a plurality of copy destination storage apparatuses.

Figure 3:
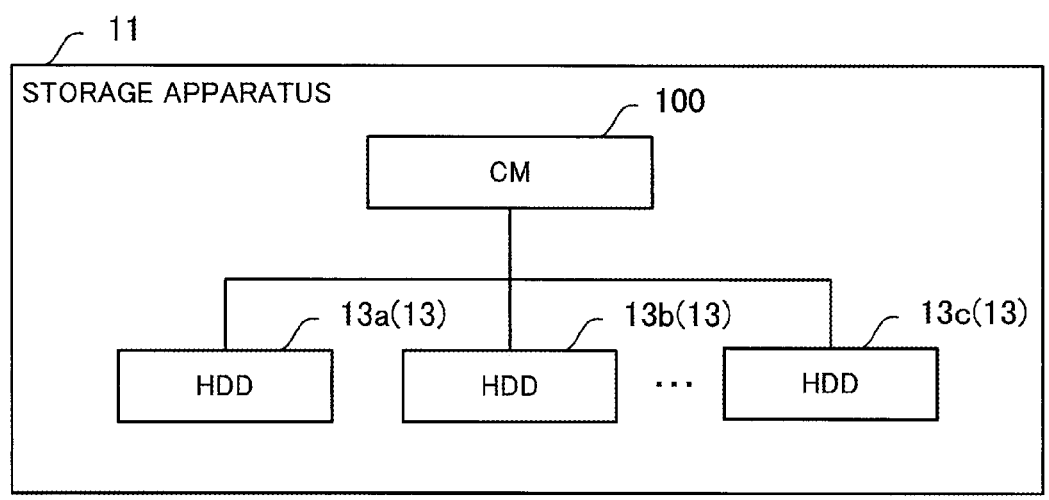
FIG. 3 illustrates an exemplary configuration of a storage apparatus of the second embodiment.

Next, a configuration of a storage apparatus 11 of the second embodiment will be described, referring to FIG. 3. FIG. 3 illustrates an exemplary configuration of the storage apparatus 11 of the second embodiment.

The storage apparatus 11 includes a CM 100 and a plurality of HDDs (Hard Disk Drives) 13 (13a, 13b, . . . , 13c). The storage apparatus 11 implements one or more volumes (LUNs (Logical Unit Numbers)) using a plurality of HDDs 13. The CM (Controller Module) 100, which is a control apparatus configured to control the storage apparatus 11, receives an I/O request from an unillustrated host computer, and writes and reads data to and from the HDDs 13.

The CM 100 may be provided integrally with, or separately from the storage apparatus 11.

Figure 4:
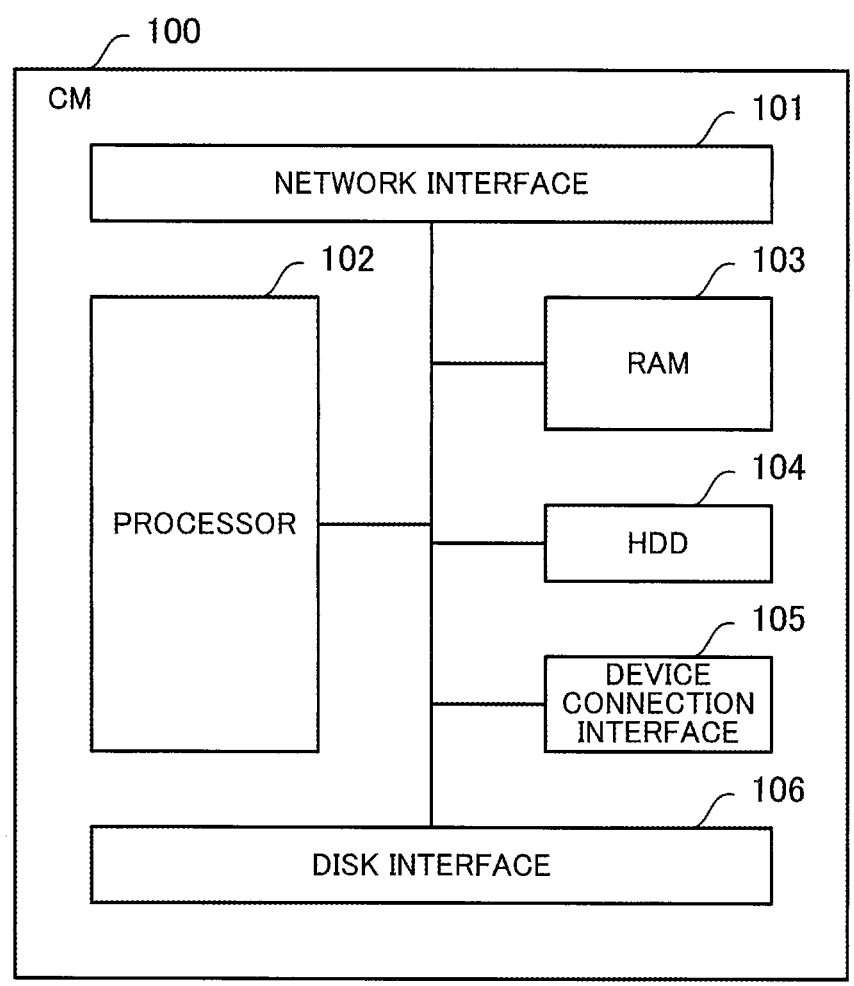
FIG. 4 illustrates an exemplary hardware configuration of a CM of the second embodiment.

Next, a hardware configuration of the CM 100 will be described, referring to FIG. 4. FIG. 4 illustrates an exemplary hardware configuration of the CM of the second embodiment.

The CM 100 includes a network interface 101, a processor 102, a RAM (Random Access Memory) 103, an HDD 104, a device connection interface 105, and a disk interface 106.

The CM 100 as a whole is controlled by the processor 102. The processor 102 has the RAM 103 and a plurality of peripheral devices connected thereto via a bus. The processor 102 may be a multi-core processor including two or more processors.

The processor 102 is, for example, a CPU (Central Processing Unit), an MPU (Micro Processing Unit), a DSP (Digital Signal Processor), an ASIC (Application Specific Integrated Circuit), or a PLD (Programmable Logic Device).

The RAM 103 is used as the main storage device of the CM 100. The RAM 103 has temporarily stored therein at least a part of the OS (Operating System) program or application programs to be executed by the processor 102. In addition, the RAM 103 has stored therein various data needed for processing by the processor 102. In addition, the RAM 103 functions as a cache memory of the processor 102.

The peripheral devices connected to the bus include the network interface 101, the HDD 104, the device connection interface 105, and the disk interface 106.

The network interface 101 transmits and receives data to and from other storage apparatuses 11 via the network 12.

The HDD 104 magnetically writes and reads data to and from a built-in disk. The HDD 104 is used as an auxiliary memory of the CM 100. The HDD 104 has stored therein the OS program, application programs, and various data. A semiconductor storage device such as a flash memory may also be used as an auxiliary memory.

The device connection interface 105 is a communication interface for connecting peripheral devices to the CM 100. For example, the device connection interface 105 may have an unillustrated memory device or memory reader/writer connected thereto. The memory device is a storage medium implementing a function of communicating with the device connection interface 105. The memory reader/writer is a device configured to write data into, or read data from a memory card. The memory card is, for example, a card-shaped storage medium.

In addition, the device connection interface 105 may have an unillustrated monitor connected thereto. In such a case, the device connection interface 105 is provided with a graphical processing function of displaying an image on the screen of the monitor according to an instruction from the processor 102.

In addition, the device connection interface 105 may connect an unillustrated keyboard or mouse. In such a case, the device connection interface 105 transmits signals sent from the keyboard or mouse to the processor 102. A mouse is an exemplary pointing device, and another pointing device may be used. There may be used, as another pointing device, a touch panel, a tablet, a touchpad, a track ball, or the like.

In addition, the device connection interface 105 may connect an unillustrated optical drive device. An optical drive device uses laser beam to read data stored in the optical disk. An optical disk is a portable storage medium having data stored thereon in a manner readable by reflection of light. There may be used, as an optical disk, a DVD (Digital Versatile Disc), a DVD-RAM, a CD-ROM (Compact Disc Read Only Memory), a CD-R (Recordable)/RW (ReWritable), or the like.

The disk interface 106 transmits or receives data to and from one or two or more HDDs 13.

The processing function of the CM 100 of the second embodiment may be realized with the aforementioned hardware configuration. The storage control apparatus 2 described in the first embodiment may also be realized with a similar hardware configuration as that of the CM 100 illustrated in FIG. 4.

The CM 100 realizes the processing function of the second embodiment by executing, for example, a program stored on a computer-readable storage medium. The program having described therein the content of processing to be executed by the CM 100 may be stored in various storage media. For example, a program to be executed by the CM 100 may be stored in the HDD 104. The processor 102 loads at least a part of the program in the HDD 104 to the RAM 103, and executes the program. In addition, the program to be executed by the CM 100 may be stored on an optical disk, a memory device, a portable storage medium such as a memory card, or the like. The program stored in the portable storage medium becomes executable after having been installed in the HDD 104, according to control by the processor 102, for example. In addition, the processor 102 may read and execute a program directly from a portable storage medium.

Figure 5:
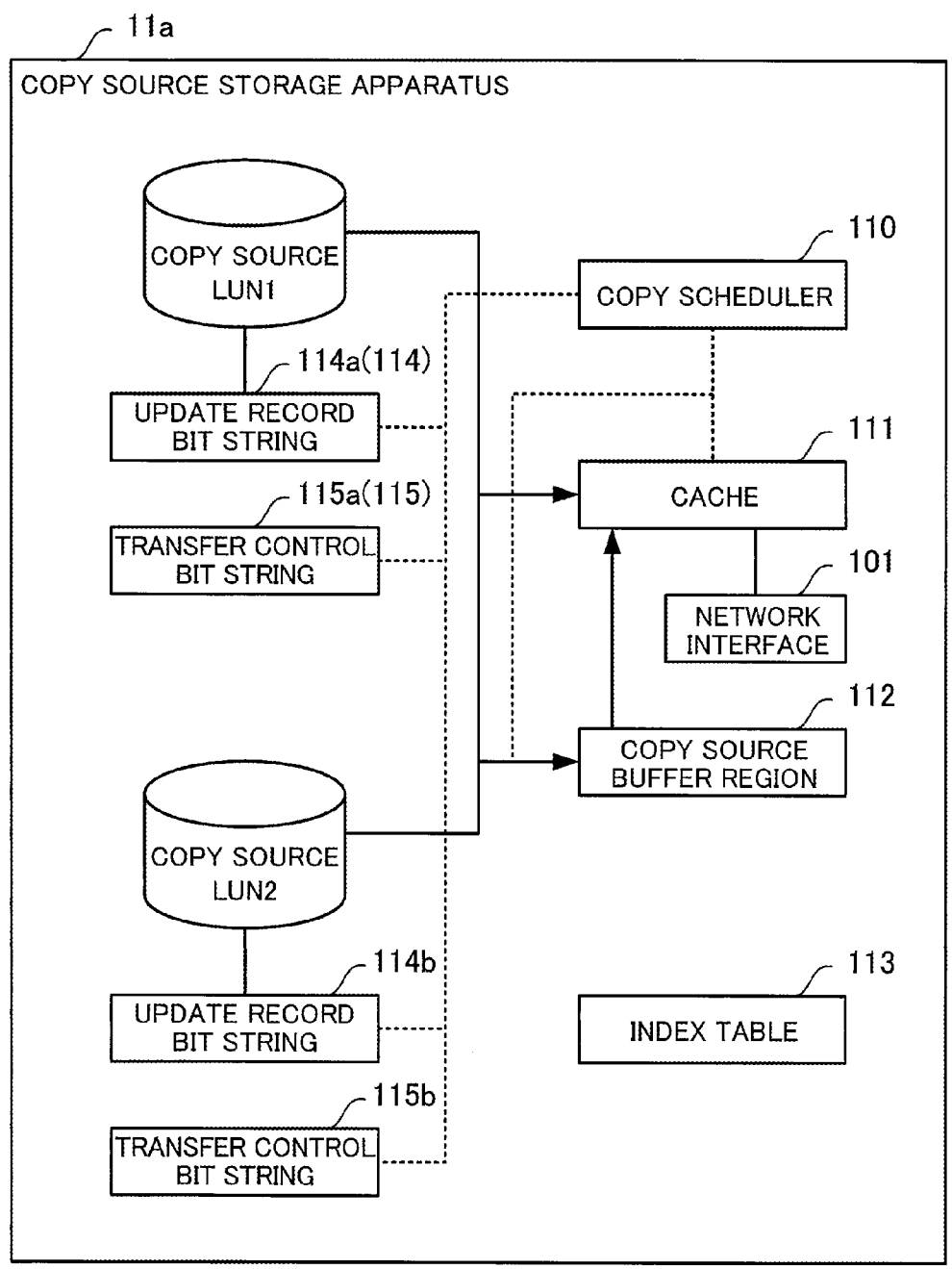
FIG. 5 illustrates an exemplary functional configuration of a copy source storage apparatus of the second embodiment.

Next, the functional configuration when the storage apparatus 11 operates as a copy source storage apparatus and the outline of the processing performed by the copy source storage apparatus will be described, referring to FIG. 5. FIG. 5 illustrates an exemplary functional configuration of the copy source storage apparatus of the second embodiment.

The copy source storage apparatus 11a is one being the copy source of remote copy among the plurality of storage apparatuses 11 in the storage system 10. The copy source storage apparatus 11a has one or more copy source LUNs, namely, a copy source LUN1 and a copy source LUN2, for example. A copy source LUN stores, as a copy source volume, a data set to be copied to a copy destination storage apparatus.

The copy source storage apparatus 11a creates a copy session for each of the storage apparatuses 11 to be the copy destination, and prepares a copy source buffer region 112 for each copy session. The copy source storage apparatus 11a, being capable of creating a plurality of copy sessions, performs independent copy control for each copy session.

Upon receiving a data update (update data set) for the copy source LUN, the copy source storage apparatus 11a stores the update data set in the copy source buffer region 112. At this point, the copy source storage apparatus 11a does not perform data update in the copy source LUN. The copy source storage apparatus 11a stores, into an index table 113, the correspondence relation between the area in the copy source LUN where the data set before update is stored and the area where the copy source buffer region 112 stores the update data set. Accordingly, the copy source storage apparatus 11a may perform data update from the copy source buffer region 112 and the index table 113 to the copy source LUN at a desired timing. The copy source storage apparatus 11a holds the index table 113 for each of the copy source buffer regions 112.

The copy source buffer region 112 stores a data set for updating the copy source LUN in a storage area according to the order of updates. The copy source buffer region 112 has storage areas for respective update generations according to the order of updates. The copy source storage apparatus 11a stores an update data set of a predetermined unit in the copy source buffer region 112 as one generation data set, making update data sets manageable for each update generation. For example, the copy source storage apparatus 11a changes the generation for which an update data set is stored when a certain time has elapsed, or the size of the update data set has exceeded a predetermined amount.

The copy source storage apparatus 11a stores update data sets of generations to be transmitted, among the generation data sets stored in the copy source buffer region 112, in a cache 111 and also in the copy source LUN individually for each generation. The cache 111 is a memory configured to temporarily store a data set to be transferred (transfer data set) to the copy destination storage apparatus. The copy source storage apparatus 11a transfers the data set stored in the cache 111 from the network interface 101 to the copy destination storage apparatus. Accordingly, the copy source storage apparatus 11a keeps the consistency with the copy destination storage apparatus.

As thus described, since the copy source storage apparatus 11a transfers data sets individually for each generation, the transfer data sets will never turn out to be imperfect data sets in respective generations. The copy source buffer region 112 may be shared in a plurality of copy sessions. For example, when it is desired to keep consistency of a data set in the copy source LUN1 and the copy source LUN2 in total, which belong to the copy source storage apparatus 11a, respective copy sessions thereof share a single copy source buffer region 112.

On the other hand, although the copy source buffer region 112 releases a storage area by performing data update in the copy source LUN, storage capacity may be exhausted due to network failure or excessive updating. The copy source storage apparatus 11a secures storage capacity of the copy source buffer region 112 by releasing a part of the areas for individual generations in the copy source buffer region 112 and performing data update in the copy source LUN. On this occasion, the copy source storage apparatus 11a creates an update record bit string 114 indicating the update area for each copy source LUN and a transfer control bit string 115. For example, the copy source storage apparatus 11a creates the update record bit string 114a and the transfer control bit string 115a in association with the copy source LUN1, and creates the update record bit string 114b and the transfer control bit string 115b in association with the copy source LUN2. Subsequently, when data transfer to the copy destination storage apparatus has become possible, the copy source storage apparatus 11a stores the transmission data set in the cache 111, referring to the update record bit string 114 and the transfer control bit string 115.

The transfer control bit string 115, having a format similar to that of the update record bit string 114, is information used for sequence control of data transfer based on the update record bit string 114. In addition, the transfer control bit string 115 is information to be integrated with the update record bit string 114 when the copy source buffer region is exhausted again. Therefore, the transfer control bit string 115 may be regarded as a form of the update record bit string 114. Details of the update record bit string 114 and the transfer control bit string 115 will be described below.

The cache 111 stores a transfer data set for which the update record bit string 114 is not created and a transfer data set for which the update record bit string 114 is created. Therefore, the copy source storage apparatus 11a stores the transfer data set in the cache 111 in a format which is recognizable by the copy destination storage apparatus. Accordingly, the copy destination storage apparatus may distinguish whether or not the transfer data has the update record bit string 114 created therefor.

The copy source storage apparatus 11a includes a copy scheduler 110. The copy scheduler 110 functions as a control unit configured to control remote copy, the processing function of the copy scheduler 110 being realized by executing a program by the processor 102, for example. When the copy source storage apparatus 11a receives an update data set, the copy scheduler 110 stores the update data set in an appropriate generation while checking the usage status of the copy source buffer region 112. In addition, when the copy source buffer region has been exhausted, the copy scheduler 110 creates (and also updates) the update record bit string 114 and the transfer control bit string 115. In addition, when data is transferable to the copy destination storage apparatus, the copy scheduler 110 stores the data set which has been read from the copy source LUN to the cache 111 according to the update record bit string 114 and the transfer control bit string 115.

The copy source storage apparatus 11a may hold the cache 111, the copy source buffer region 112, the index table 113, the update record bit string 114, and the transfer control bit string 115 in the RAM 103 or the HDD 104.

Figure 6:
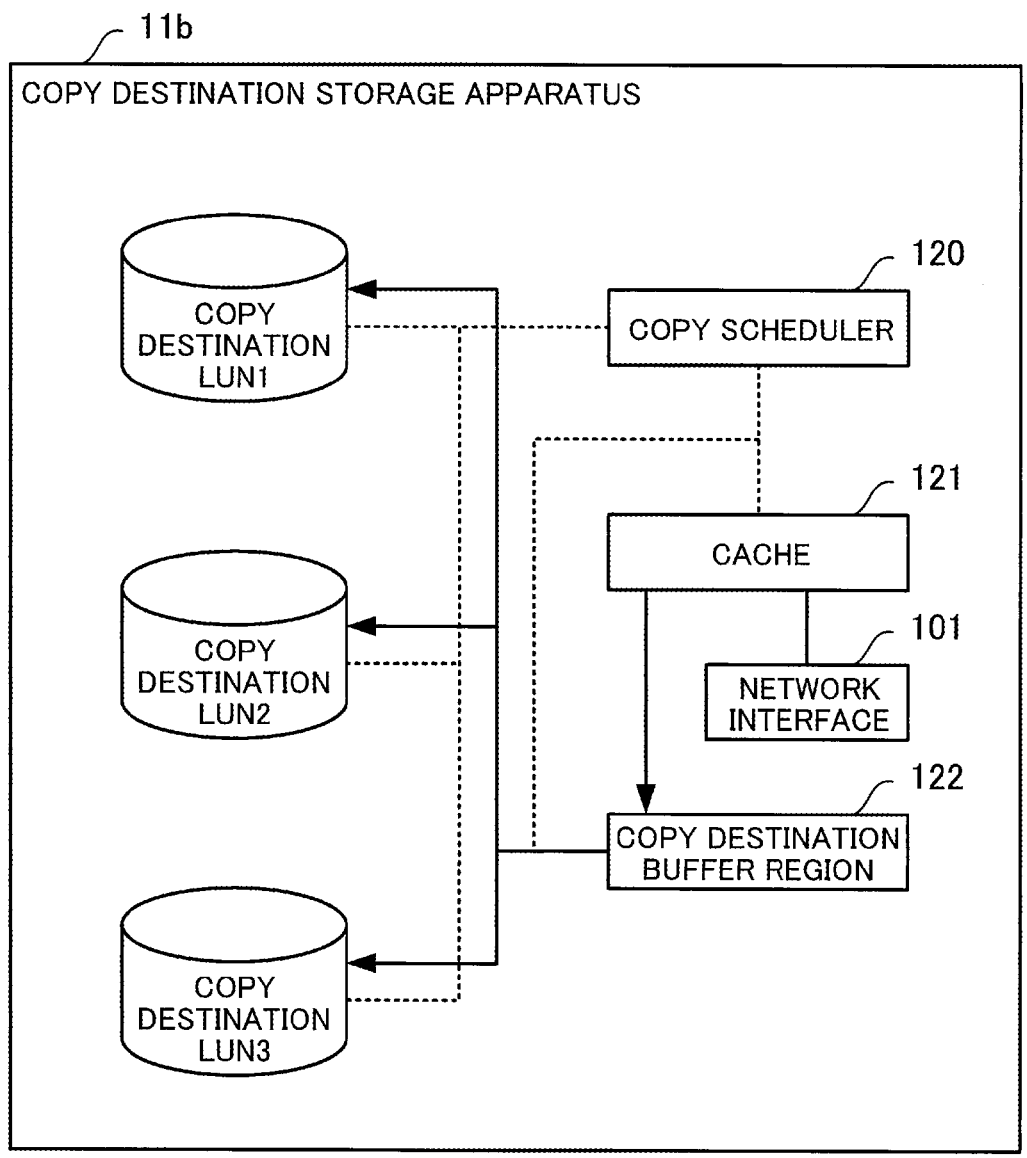
FIG. 6 illustrates an exemplary functional configuration of a copy destination storage apparatus of the second embodiment.

Next, the functional configuration of the storage apparatus 11 when operating as a copy destination storage apparatus and the outline of the processing performed by the copy destination storage apparatus will be described, referring to FIG. 6. FIG. 6 illustrates an exemplary functional configuration of the copy destination storage apparatus of the second embodiment.

The copy destination storage apparatus 11b is one being the copy destination of remote copy, among the plurality of storage apparatuses 11 in the storage system 10. The copy destination storage apparatus 11b has one or more copy destination LUNs, namely, a copy destination LUN1, a copy destination LUN2, and a copy destination LUN3, for example. A copy destination LUN stores, as a copy destination volume, a data set to be copied from a copy source storage apparatus.

The copy destination storage apparatus 11b includes a copy scheduler 120. The copy scheduler 120 functions as a control unit configured to control remote copy, the processing function of the copy scheduler 120 being realized by executing a program by the processor 102, for example. The copy destination storage apparatus 11b stores the transfer data set from the copy source storage apparatus 11a in a cache 121 via the network interface 101. The copy scheduler 120 performs a process according to the type of the data set stored in the cache 121. The copy scheduler 120 stores a transfer data set for which the update record bit string 114 is not created, among the transfer data sets stored in the cache 121, in an area corresponding to a corresponding generation of the copy destination buffer region 122. Having completed receiving one generation data set of the copy destination buffer region 122, the copy scheduler 120 stores a data set of a corresponding generation from the copy destination buffer region 122 in a corresponding area in the copy destination LUN. In addition, the copy scheduler 120 stores a transfer data set for which the update record bit string 114 has been created, among the transfer data sets stored in the cache 121, in a corresponding area in the copy destination LUN.

The copy destination storage apparatus 11b may hold the cache 121 and the copy destination buffer region 122 in the RAM 103 or the HDD 104.

Figure 7:
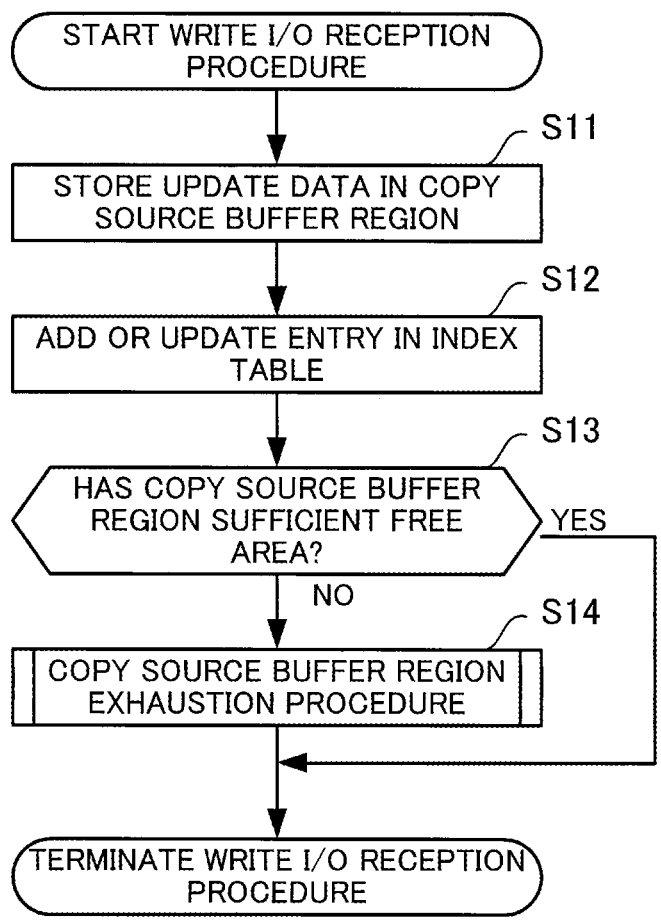
FIG. 7 illustrates a flowchart of a write I/O reception procedure of the second embodiment.

Next, a write I/O reception procedure will be described, referring to FIG. 7. FIG. 7 illustrates a flowchart of the write I/O reception procedure of the second embodiment.

The write I/O reception procedure is a process of storing, in the copy source buffer region 112, an update data set (including a data set to be newly written) received by an write I/O. The write I/O reception procedure is a process performed by the copy source storage apparatus 11a (copy scheduler 110) upon receiving a write I/O from an unillustrated host computer.

(Step S11) The copy scheduler 110 stores the update data set for the copy source LUN in an area corresponding to the latest generation of the copy source buffer region 112. The copy scheduler 110 refers to the index table 113 and, when the copy source buffer region 112 has stored therein a data set (update data set of an old generation) to be overwritten with the update data set, deletes the update data set of the old generation from the copy source buffer region 112.

(Step S12) The copy scheduler 110 adds or updates an entry corresponding to the update data set in the index table 113.

(Step S13) The copy scheduler 110 determines whether or not the copy source buffer region 112 has a sufficient free area. When the copy source buffer region 112 does not have a sufficient free area, the copy scheduler 110 proceeds to step S14, or terminates the write I/O reception procedure when the copy source buffer region 112 has a sufficient free area. For example, the copy scheduler 110 may determine whether or not the copy source buffer region 112 has a sufficient free area by comparing the free area in the copy source buffer region 112 with a threshold set in advance.

(Step S14) The copy scheduler 110 performs a copy source buffer region exhaustion procedure. The copy source buffer region exhaustion procedure is a process of releasing a predetermined area in the copy source buffer region 112 to secure a free area, when the copy source buffer region 112 does not have a sufficient free area, i.e., it has turned out that the copy source buffer region 112 is exhausted. The copy source buffer region exhaustion procedure will be described below, referring to FIG. 15. The copy scheduler 110 terminates the write I/O reception procedure after having executed the copy source buffer region exhaustion procedure.

Here, the index table 113 will be described, referring to FIG. 8. FIG. 8 illustrates an exemplary index table of the second embodiment.

An index table 301 is an example of the index table 113. The index table 301 includes a "LUN:LBA" column and a "buffer address" column. The "LUN:LBA" column indicates identification information capable of identifying a copy source LUN, and an LBA (Logical Block Address) in the copy source LUN. The "buffer address" column indicates the address of the copy source buffer region 112. The index table 301 includes a pair of the "LUN:LBA" column and the "buffer address" column as an entry. The entry indicates the storage position of the data set for updating the "LUN:LBA" column in the copy source buffer region 112.

For example, an entry including LUN:LBA "0x00: "0x100" and a buffer address "0x1000" indicates that the data set for updating the LBA "0x100" of the LUN "0x00" is stored in the buffer address "0x1000" of the copy source buffer region 112.

Figure 9:
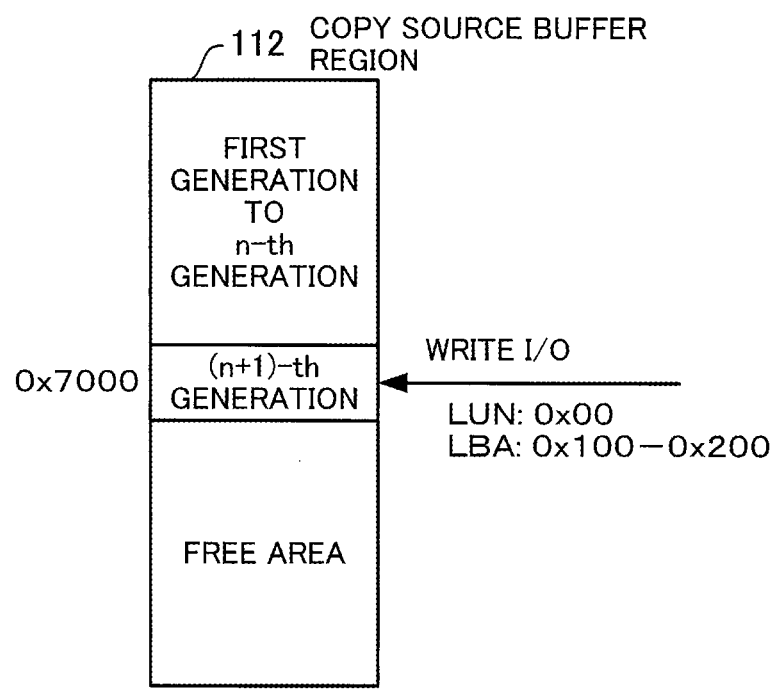
FIG. 9 illustrates an exemplary update of the copy source buffer region based on reception of a write I/O in the second embodiment.

Addition or updating of an entry in the aforementioned index table 301 will be described, referring to FIGS. 9 and

10. First, updating of the copy source buffer region 112 based on reception of a write I/O will be described, referring to FIG. 9. FIG. 9 illustrates an exemplary updating of the copy source buffer region based on reception of a write I/O in the second embodiment.

There is illustrated a state in which the copy source buffer region 112 having stored therein update data sets ranging from the first to the n-th generations receives a write I/O with an LBA "0x100-0x200" of an LUN "0x00" being the update destination and stores an update data set as an (n+1)-th generation data set. On this occasion, the copy scheduler 110 adds an entry corresponding to the update data set to the index table 113 when there is no entry overlapping with LUN:LBA "0x00:0x100-0x200" in the index table 113. In such a case, an entry including LUN:LBA "0x00:0x100" and a buffer address "0x7000" is added to the index table 113.

On the other hand, when there exists an entry overlapping with LUN:LBA "0x00:0x100-0x200" in the index table 113, the copy scheduler 110 deletes the overlapping entry from the index table 113, and adds the entry corresponding to the update data set. In other words, when it turns out that there are overlapping entries, the copy scheduler 110 updates the old entry in the index table 113 with a new entry.

Here, updating of the index table 113 based on reception of a write I/O will be described, referring to FIG. 10. FIG. 10 illustrates an exemplary updating of an index table based on reception of a write I/O in the second embodiment.

An index table 302 is a result of updating the index table 301 (see FIG. 8) by adding thereto an entry (additional entry) including LUN:LBA "0x00:0x100" and the buffer address "0x7000". The index table 301 has the entry (existing entry) including LUN:LBA "0x00:0x100 and the buffer address "0x1000", and therefore LUN:LBA "0x00:0x100" overlaps with the additional entry. Accordingly, the copy scheduler 110 performs an update of deleting the overlapping existing entry and adding the additional entry. Thereby, the copy scheduler 110 may efficiently use the copy source buffer region 112, as well as reducing the amount of transfer data, and enabling quick recovery from the state in which order is not guaranteed due to buffer region exhaustion.

Figure 11:
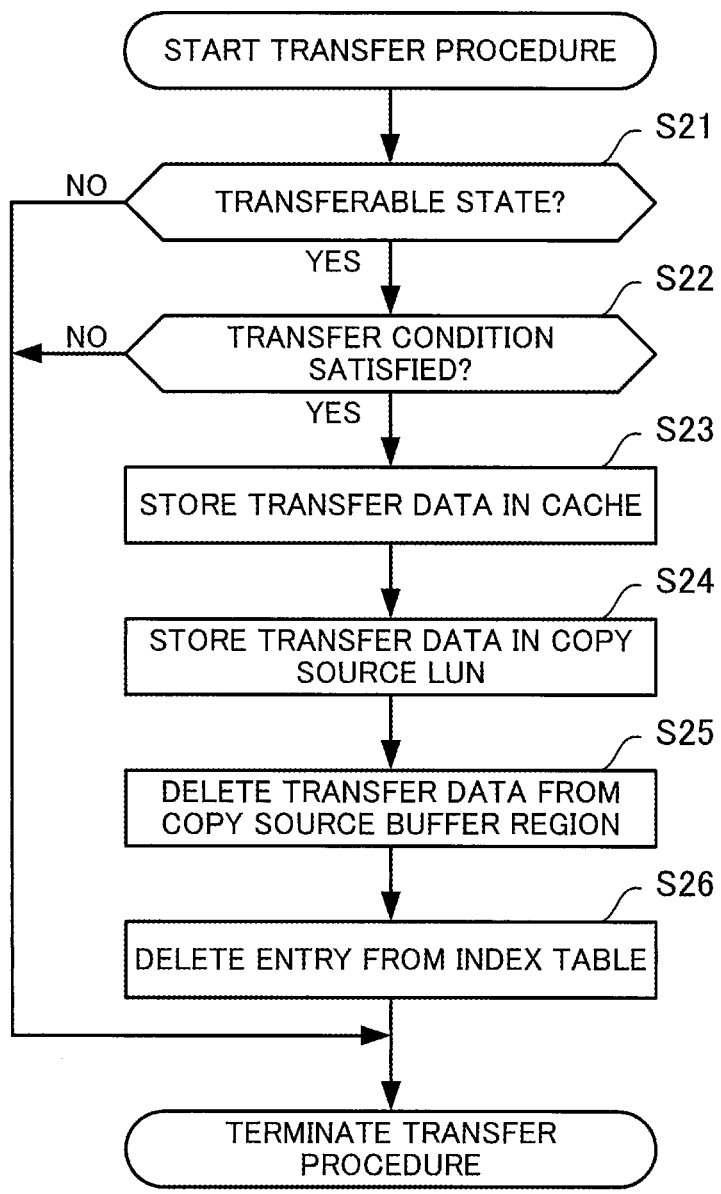
FIG. 11 illustrates a flowchart of a transfer procedure of the second embodiment.

Next, a transfer procedure will be described, referring to FIG. 11. FIG. 11 illustrates a flowchart of a transfer procedure of the second embodiment.

The transfer procedure is a process of transferring an update data set stored in the copy source buffer region 112 to the copy destination storage apparatus 11*b*. The transfer procedure is a process performed by the copy source storage apparatus 11*a* (copy scheduler 110) with the copy source buffer region 112 storing the update data set.

(Step S21) The copy scheduler 110 determines whether or not the system is in a transferable state. The transferable state is a state in which the copy source storage apparatus 11*a* and the copy destination storage apparatus 11*b* are communicable with each other, and data is transferable from the copy source storage apparatus 11*a* to the copy destination storage apparatus 11*b*. The copy scheduler 110 proceeds to step S22 when the system is in a transferable state, or terminates the transfer procedure when the system is not in a transferable state.

(Step S22) The copy scheduler 110 determines whether or not a transfer condition is satisfied. The transfer condition is a predetermined condition for performing data transfer from the copy source storage apparatus 11*a* to the copy destination storage apparatus 11*b*. The transfer condition includes, for example, that a predetermined time has elapsed since an update data set was stored in the copy source buffer region 112, that a predetermined amount of update data of one generation have been stored, or the like. The copy scheduler 110 proceeds to step S23 when the transfer condition is satisfied, or terminates the transfer procedure when the transfer condition is not satisfied.

(Step S23) The copy scheduler 110 stores, in the cache 111, a data set (transfer data set) of a generation to be transferred. The data set stored in the cache 111 is transferred to the copy destination storage apparatus 11*b* via the network interface 101 at a desired timing.

(Step S24) The copy scheduler 110 stores the transfer data set in the copy source LUN. Accordingly, the copy source LUN is updated with the update data set based on the write I/O.

(Step S25) The copy scheduler 110 deletes the transfer data set from the copy source buffer region 112. Accordingly, the area storing the transfer data set in the copy source buffer region 112 is released.

(Step S26) The copy scheduler 110 searches the index table 113 with the released buffer address being the key, and deletes the hit entry (entry corresponding to the transfer data set). Having deleted the hit entry, the copy scheduler 110 terminates the transfer procedure.

Figure 12:
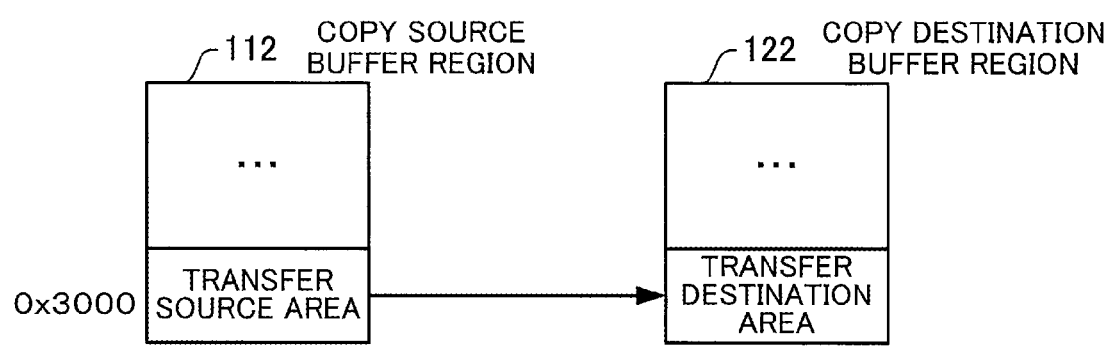
FIG. 12 illustrates an exemplary deletion of a transfer data set from the copy source buffer region in the second embodiment.

Such deletion of the transfer data set from the copy source buffer region 112 and deletion of the entry corresponding to the transfer data set from the index table 113 will be described, referring to FIGS. 12 and 13. First, deletion of the transfer data set from the copy source buffer region 112 will be described, referring to FIG. 12. FIG. 12 illustrates an exemplary deletion of the transfer data set from the copy source buffer region in the second embodiment.

With regard to the copy source buffer region 112, a buffer address "0x3000" is selected as the transfer source area, and the data set stored in the transfer source area is selected to be transferred to the copy destination buffer region 122. The transfer from the copy source buffer region 112 to the copy destination buffer region 122 is performed via the cache 111 of the copy source storage apparatus 11*a* and the cache 121 of the copy destination storage apparatus 11*b*. The copy source buffer region 112 transfers the data set to the copy destination buffer region 122, stores the data set in the copy source LUN, and subsequently releases the area of the buffer address "0x3000".

Here, updating of the index table 113 based on data transfer will be described, referring to FIG. 13. FIG. 13 illustrates an exemplary deletion of the entry corresponding to the transfer data set from the index table in the second embodiment.

An index table 303 is a result of deleting the entry corresponding to the transfer data set from the index table 302 (see FIG. 10). Although the index table 302 has an entry (delete entry) including LUN:LBA "0x00:0x200" and the buffer address "0x3000", the index table 303 does not have a delete entry.

Figure 14:
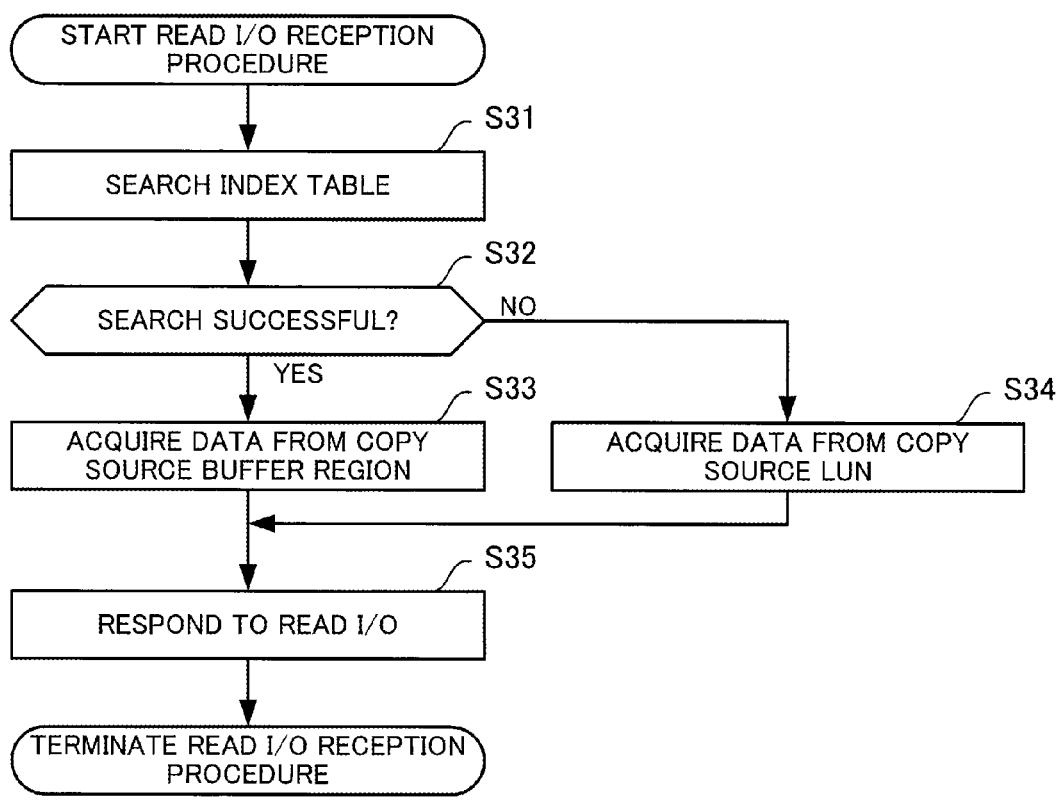
FIG. 14 illustrates a flowchart of a read I/O reception procedure of the second embodiment.

Next, a read I/O reception procedure will be described, referring to FIG. 14. FIG. 14 illustrates a flowchart of the read I/O reception procedure of the second embodiment.

The read I/O reception procedure is a process of reading a data set (data set to be read) from the copy source LUN according to a read I/O. The read I/O reception procedure is a process performed by the copy source storage apparatus 11*a* (copy scheduler 110) upon receiving a read I/O from an unillustrated host computer.

(Step S31) The copy scheduler 110 searches the index table 113 for an entry including an area to be read in the copy source LUN requested by the read I/O.

(Step S32) The copy scheduler 110 determines whether or not the search has resulted in a hit, i.e., whether or not a corresponding entry is included in the index table 113. The copy scheduler 110 proceeds to step S33 when the search has resulted in a hit, or proceeds to step S34 when the search has not resulted in a hit.

(Step S33) Since a corresponding entry is included in the index table 113, the copy scheduler 110 acquires a data set to be read from the copy source buffer region 112, referring to the index table 113.

(Step S34) Since a corresponding entry is not included in the index table 113, the copy scheduler 110 acquires the data set to be read from the copy source LUN.

(Step S35) The copy scheduler 110 responds to the read I/O by returning the acquired data set to be read, and terminates the read I/O reception procedure.

As thus described, the copy source storage apparatus 11a may return a data set to be read to the read I/O referring to the index table 113, even when the copy source buffer region 112 has stored therein the data set which is not written in the copy source LUN.

Figure 15:
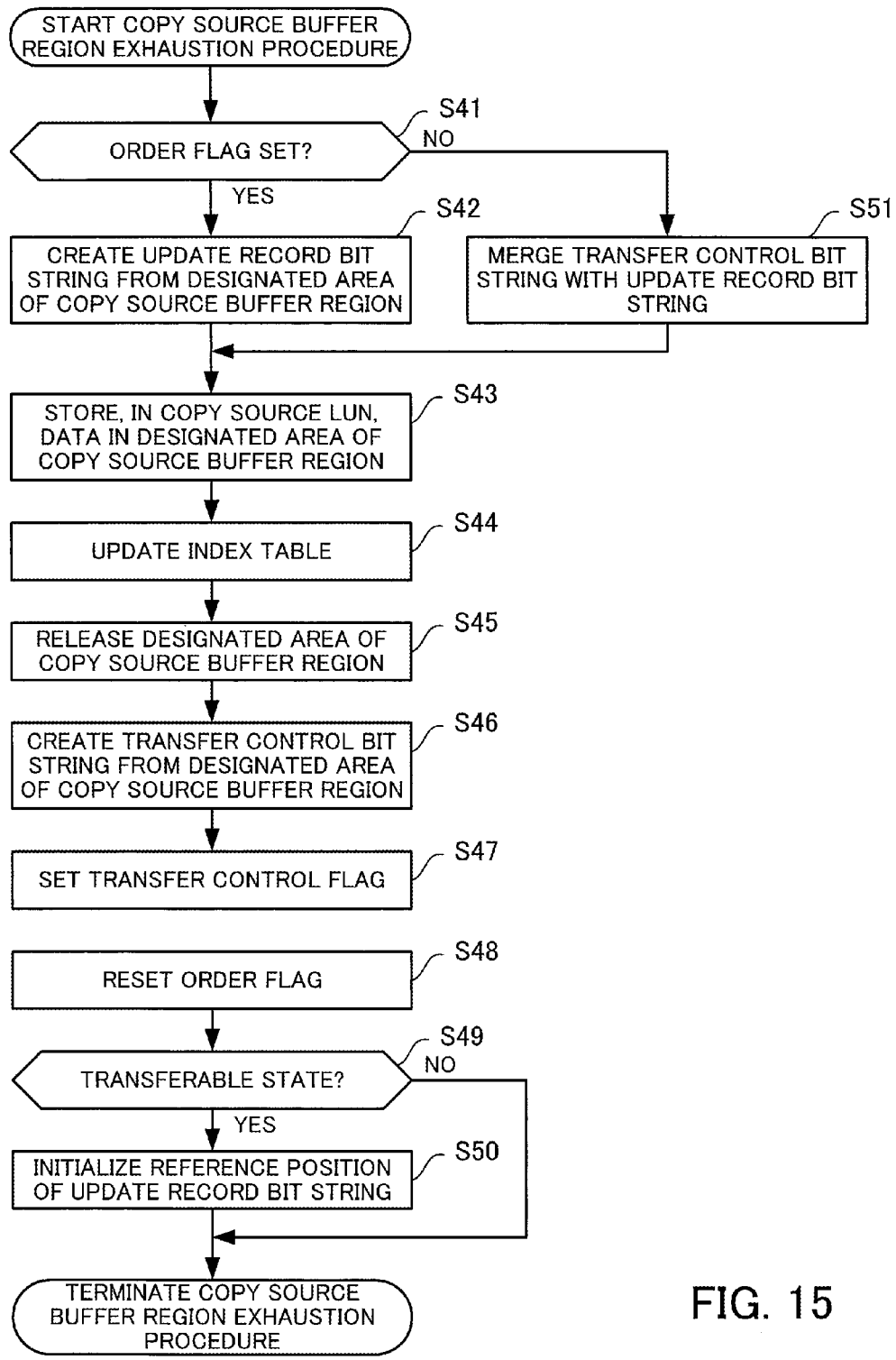
FIG. 15 illustrates a flowchart of a copy source buffer region exhaustion procedure by the second embodiment.

Next, a copy source buffer region exhaustion procedure will be described, referring to FIG. 15. FIG. 15 illustrates a flowchart of the copy source buffer region exhaustion procedure of the second embodiment.

The copy source buffer region exhaustion procedure is a process of releasing a predetermined area in the copy source buffer region 112 to secure a free area when the copy source buffer region 112 does not have the sufficient free area. The copy source buffer region exhaustion procedure is a processing performed by the copy scheduler 110 at step S14 of the write I/O reception procedure.

(Step S41) The copy scheduler 110 determines whether or not an order flag has been set. The copy scheduler 110 proceeds to step S42 when the order flag has been set, or proceeds to step S51 when the order flag has not been set (has been reset). The order flag being set (e.g., ON) indicates a state in which the order of remote copy is guaranteed, and the order flag being reset (e.g., OFF) indicates a state in which the order of remote copy is not guaranteed.

(Step S42) The copy scheduler 110 creates the update record bit string 114 from the designated area of the copy source buffer region 112. In other words, the copy scheduler 110 creates the update record bit string 114 with the order being guaranteed.

The designated area is an area to be released in the copy source buffer region 112. The designated area is, for example, an area for storing data sets of a predetermined number of generations in chronological order. The update record bit string 114 is information indicating whether an update has been made for each predetermined area in the copy source LUN, with the positions of bits in the bit string indicating the positions of areas in the copy source LUN and each bit indicating whether an update has been made to a corresponding area.

(Step S43) The copy scheduler 110 stores, in the copy source LUN, a data set stored in the designated area of the copy source buffer region 112. Specifically, the copy scheduler 110 searches the address of the copy source LUN from the index table 113 with the buffer address corresponding to the designated area of the copy source buffer region 112 being the key, and stores the data set in the copy source LUN.

(Step S44) The copy scheduler 110 updates the index table 113. Specifically, the copy scheduler 110 searches the index table 113 with the buffer address corresponding to the designated area of the copy source buffer region 112 being the key, and deletes the hit entry.

(Step S45) The copy scheduler 110 releases the designated area of the copy source buffer region 112. Accordingly, the copy source storage apparatus 11a may secure a free area in the copy source buffer region 112 and dissolve the exhaustion state of the copy source buffer region 112.

Releasing the designated area of the copy source buffer region 112 allows the update data set of write I/O to be stored in the free area in the copy source buffer region 112. Therefore, the copy source storage apparatus 11a may suppress an increase of data to be transferred to the copy destination storage apparatus 11b until the order-guaranteed state is recovered.

(Step S46) The copy scheduler 110 creates the transfer control bit string 115 from the designated area of the copy source buffer region 112. The transfer control bit string 115 is information indicating whether an update has been made for each predetermined area in the copy source LUN, with the positions of bits in a bit string indicating the positions of areas in the copy source LUN and each bit indicating whether an update has been made to a corresponding area.

The designated area mentioned in step S46 has been updated due to release of the designated area at step S45 and therefore is a different area from the designated area mentioned in steps S41 to S45. For example, when the designated area mentioned in step S42 is an area for storing data sets of the first to third generations, the designated area mentioned in step S46 is an area for storing data sets of the fourth to sixth generations at step S42. Therefore, the designated area which is the base of creating the transfer control bit string 115 is different from the designated area which is the base of creating the update record bit string 114.

(Step S47) The copy scheduler 110 sets a transfer control flag. The transfer control flag being set (e.g., ON) indicates a state in which the transfer control bit string 115 is used for transfer control in the recovery procedure, and the transfer control flag being reset (e.g., OFF) indicates a state in which the transfer control bit string 115 is not used for transfer control in the recovery procedure.

(Step S48) The copy scheduler 110 resets the order flag.

(Step S49) The copy scheduler 110 determines whether or not data is transferable (transferable state) from the copy source storage apparatus 11a to the copy destination storage apparatus 11b. The copy scheduler 110 proceeds to step S50 when data is transferable, or terminates the copy source buffer region exhaustion procedure when data is not transferable.

(Step S50) The copy scheduler 110 initializes the reference position of the update record bit string 114 in the recovery procedure performed independent of the copy source buffer region exhaustion procedure. Having initialized the reference position of the update record bit string 114, the copy scheduler 110 terminates the copy source buffer region exhaustion procedure. The reference position of the update record bit string 114 is the scanning start position when scanning the update record bit string 114 in the recovery procedure described below. The copy scheduler 110 sets the first bit, for example, to be the reference position.

(Step S51) The copy scheduler 110 merges the transfer control bit string 115 with the update record bit string 114. The copy scheduler 110 may merge the transfer control bit string 115 with the update record bit string 114 by calculating the logical sum of the transfer control bit string 115 and the update record bit string 114.

Accordingly, the update record bit string 114 has integrated therein information indicating the update area held in the update record bit string 114 before the merging, and information indicating the update area held in the transfer control bit string 115. In other words, the copy scheduler 110 updates the already created update record bit string 114 in an order-unguaranteed state. Subsequently, the copy scheduler 110, having performed the processes at and after step S43 as in the order-guaranteed state, terminates the copy source buffer region exhaustion procedure.

Figure 16:
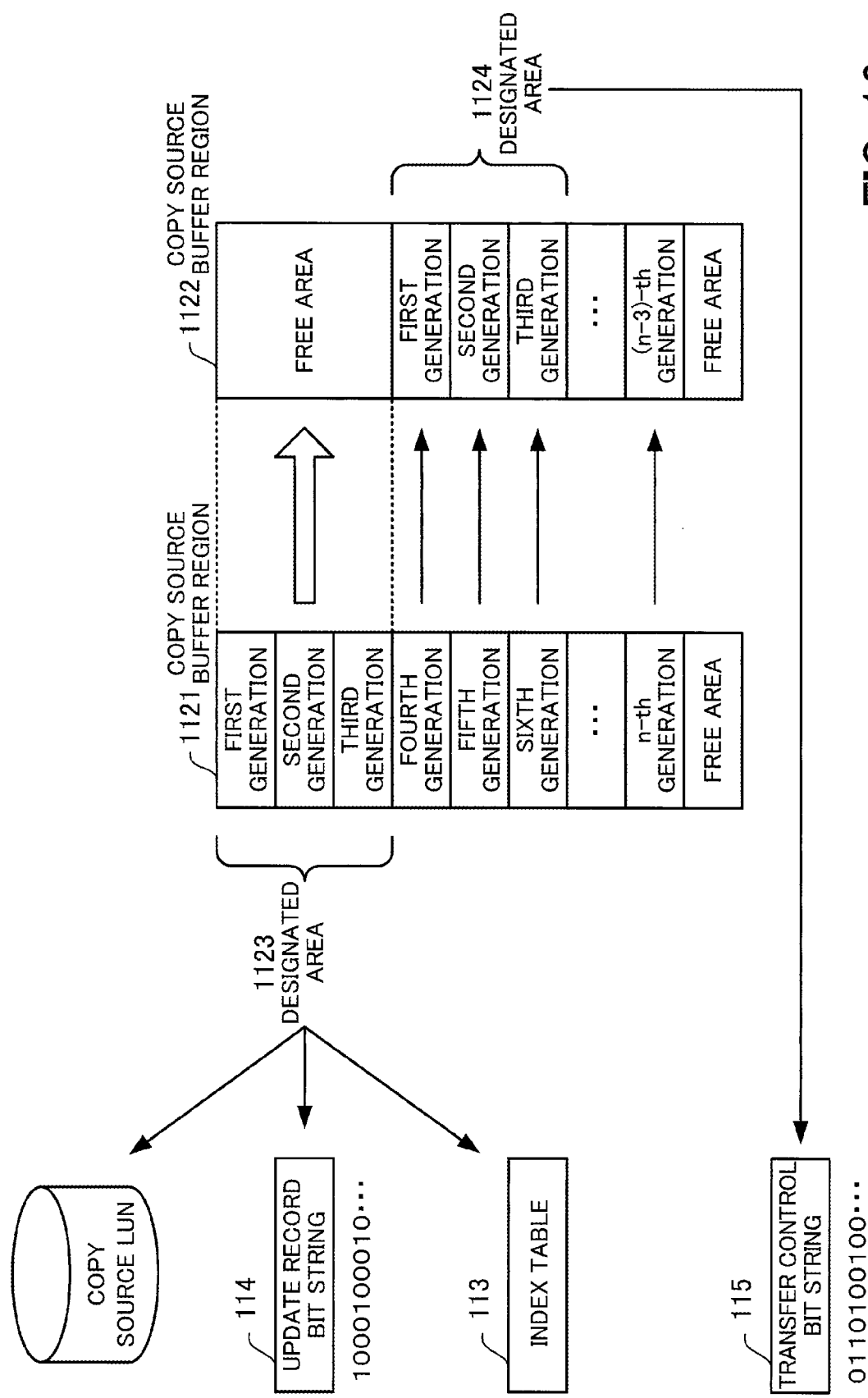
FIG. 16 illustrates an exemplary creation of an update record bit string and creation of a transfer control bit string when the copy source buffer region has been exhausted in an order-guaranteed state of the second embodiment.

Next, the processes at steps S42 to S46 performed in an order-guaranteed state in the copy source buffer region exhaustion procedure will be described, referring to FIG. 16. FIG. 16 illustrates an exemplary creation of an update record bit string and creation of a transfer control bit string when the copy source buffer region has been exhausted in an order-guaranteed state of the second embodiment.

A copy source buffer region 1121 has stored therein data sets of the first to n-th generations, in which an area storing the data sets of the first to third generations is selected as a designated area 1123. The copy scheduler 110 creates the update record bit string 114 from the data sets of the designated area 1123 (Step S42). The copy scheduler 110 stores the data sets of the designated area 1123 in the copy source LUN (Step S43), and deletes the entries corresponding to the designated area 1123 from the index table 113 (Step S44). The copy scheduler 110 releases the designated area 1123 of the copy source buffer region 1121 (Step S45).

Accordingly, the copy source buffer region 1121 turns out to be like a copy source buffer region 1122. In other words, the copy source buffer region 1122 selects the designated area 1123 of the copy source buffer region 1121 as a free area, in which the generation of each area in the copy source buffer region 1121 is updated. For example, the fourth generation of the copy source buffer region 1121 turns out to be the first generation of the copy source buffer region 1122, and an n-th generation of the copy source buffer region 1121 turns out to be an (n−3)-th generation of the copy source buffer region 1122. The copy scheduler 110 creates the transfer control bit string 115 from the data sets of the designated area 1124 of the copy source buffer region 1122 (Step S46).

Figure 17:
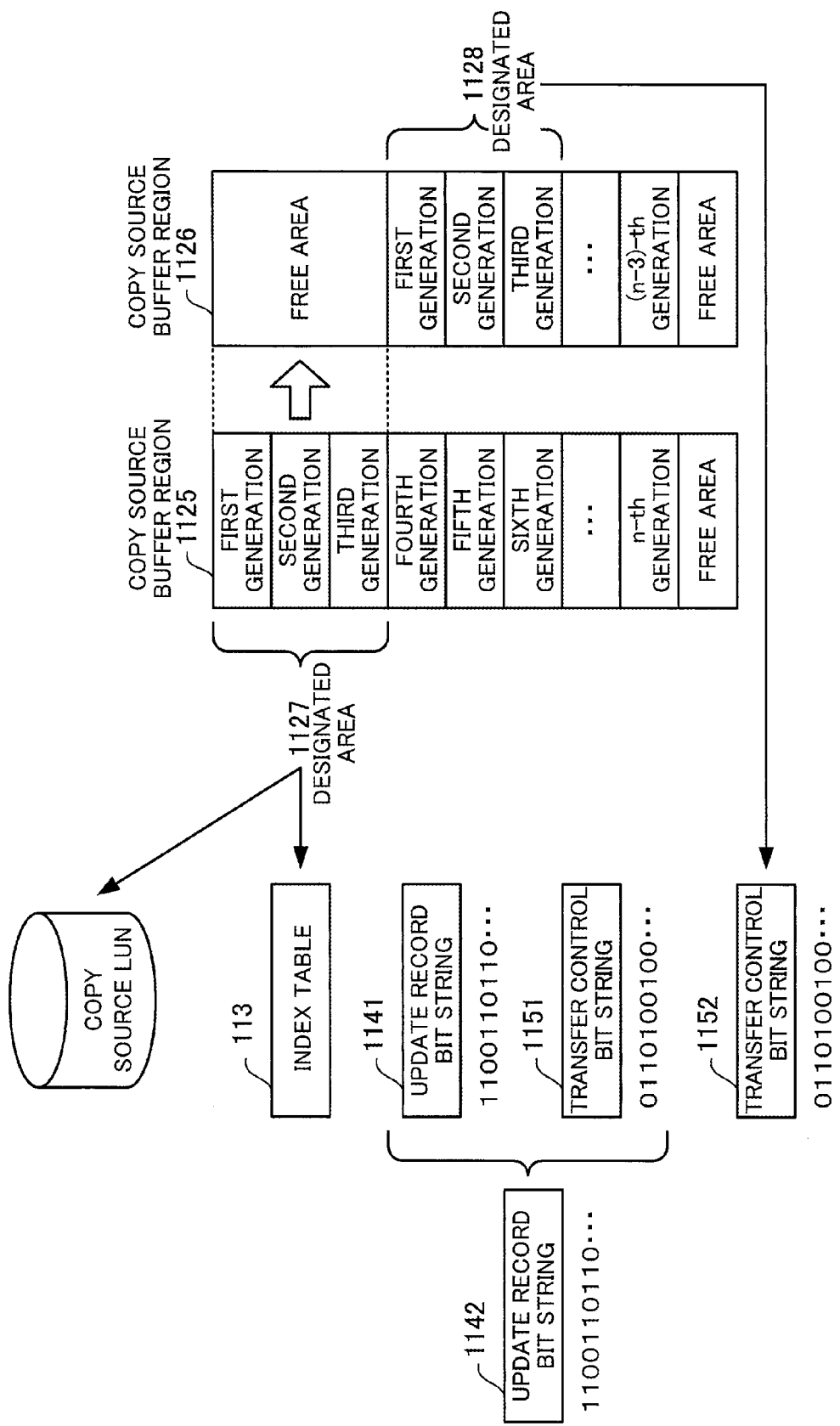
FIG. 17 illustrates an exemplary update of an update record bit string and creation of a transfer control bit string when the copy source buffer region has been exhausted in an order-unguaranteed state of the second embodiment.

Next, the process at step S51, and the processes at steps S43 to S46 performed in the order-unguaranteed state in the copy source buffer region exhaustion procedure will be described, referring to FIG. 17. FIG. 17 illustrates an exemplary update of the update record bit string and creation of a transfer control bit string when the copy source buffer region has been exhausted in the order-unguaranteed state of the second embodiment.

A copy source buffer region 1125 has stored therein data sets of the first to n-th generations, in which an area storing the data sets of the first to third generations is selected as a designated area 1127. The copy scheduler 110 merges a transfer control bit string 1151 with an update record bit string 1141 to create an update record bit string 1142 (Step S51). The copy source buffer region exhaustion procedure is performed in the order-guaranteed state at least once, before being performed in the order-unguaranteed state. Therefore, the transfer control bit string 1151 and the update record bit string 1141 are created before execution of step S51. The copy scheduler 110 stores the data set of the designated area 1127 in the copy source LUN (Step S43), and deletes the entry corresponding to the designated area 1127 from the index table 113 (Step S44). The copy scheduler 110 releases the designated area 1127 of the copy source buffer region 1125 (Step S45).

Accordingly, the copy source buffer region 1125 turns out to be like a copy source buffer region 1126. The copy scheduler 110 creates a transfer control bit string 1152 from the data set of a designated area 1128 of the copy source buffer region 1126 (Step S46).

As thus described, the transfer control bit string 115 created at step S46 is merged with the update record bit string 114 at step S51 when the next copy source buffer region exhaustion procedure is performed in the order-unguaranteed state.

As has been described referring to FIGS. 16 and 17, the copy source storage apparatus 11a creates the update record bit string 114 only for the designated area, when the copy source buffer region 112 has been exhausted. Accordingly, the number of bits turned "On" in the update record bit string is limited in comparison with the case of creating an update record bit string from the entire copy source buffer region as conventionally performed. The copy source storage apparatus 11a may reduce the amount of data to be transferred in order to return to the order-guaranteed state when recovering the path, by limiting the number of bits turned "On" in the update record bit string. Therefore, reduction of the amount of data to be transferred allows the copy source storage apparatus 11a to shorten the time needed to return to the order-guaranteed state.

Figure 18:
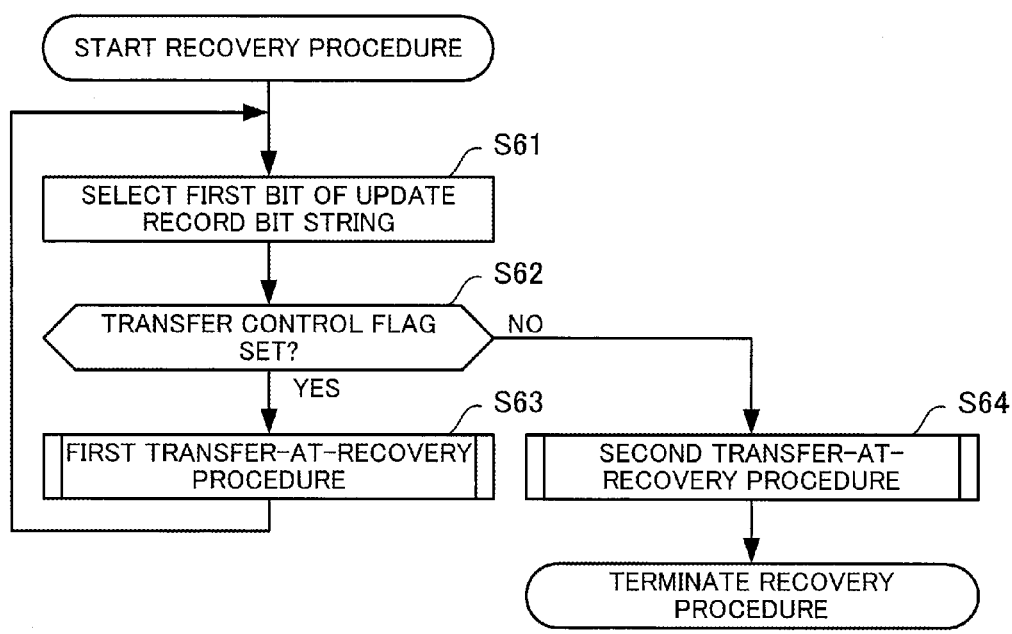
FIG. 18 illustrates a flowchart of a recovery procedure of the second embodiment.

Next, a recovery procedure will be described, referring to FIG. 18. FIG. 18 illustrates a flowchart of the recovery procedure of the second embodiment.

The recovery procedure is a process of performing data transfer from the copy source storage apparatus 11a to the copy destination storage apparatus 11b, based on the update record bit string 114, or based on the update record bit string 114 and the transfer control bit string 115. The recovery procedure is a process performed by the copy scheduler 110 when a transferable state is detected with the update record bit string 114 having been created.

(Step S61) The copy scheduler 110 selects the first bit of the update record bit string 114 as a reference position.

(Step S62) The copy scheduler 110 determines whether or not a transfer control flag has been set. The copy scheduler 110 proceeds to step S63 when the transfer control flag has been set, or proceeds to step S64 when the transfer control flag has not been set.

(Step S63) The copy scheduler 110 performs a first transfer-at-recovery procedure. The first transfer-at-recovery procedure is a process of performing data transfer from the copy source storage apparatus 11a to the copy destination storage apparatus 11b, based on the update record bit string 114 and the transfer control bit string 115. Details of the first transfer-at-recovery procedure will be described below, referring to FIG. 19. The copy scheduler 110 proceeds to step S61 after having executed the first transfer-at-recovery procedure. Since the copy scheduler 110 resets the transfer control flag during execution of the first transfer-at-recovery procedure, the first transfer-at-recovery procedure is performed only once in the recovery procedure unless the transfer control flag is set again in the copy source buffer region exhaustion procedure.

(Step S64) The copy scheduler 110 performs a second transfer-at-recovery procedure. The second transfer-at-recovery procedure is a process of performing data transfer from the copy source storage apparatus 11a to the copy destination storage apparatus 11b, based on the update record bit string 114. Details of the second transfer-at-recovery procedure will be described below, referring to FIG. 20. The copy scheduler 110 terminates the recovery procedure after having executed the second transfer-at-recovery procedure.

Figure 19:
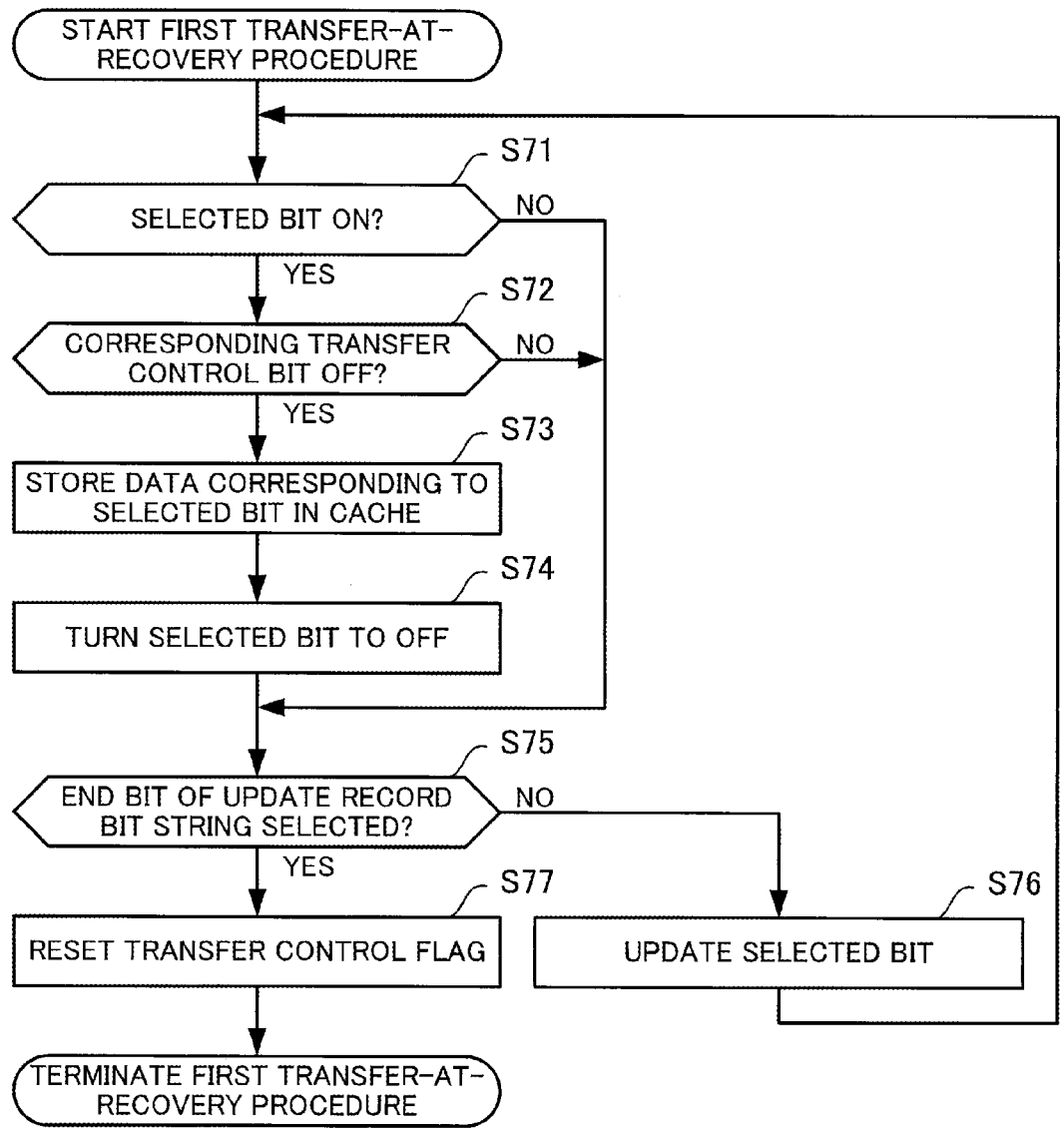
FIG. 19 illustrates a flowchart of a first transfer-at-recovery procedure of the second embodiment.

Next, the first transfer-at-recovery procedure will be described, referring to FIG. 19. FIG. 19 illustrates a flowchart of the first transfer-at-recovery procedure of the second embodiment.

The first transfer-at-recovery procedure is a process of performing data transfer from the copy source storage apparatus 11a to the copy destination storage apparatus 11b, based on the update record bit string 114 and the transfer control bit string 115. The first transfer-at-recovery procedure is a process performed by the copy scheduler 110 at step S63 of the recovery procedure.

(Step S71) The copy scheduler 110 determines whether or not a bit (selected bit) selected in the update record bit string 114 is "On". For example, an "On" bit corresponds to a bit "1", and an "Off" bit corresponds to a bit "0". The copy scheduler 110 proceeds to step S72 when the selected bit is "On", or proceeds to step S75 when the selected bit is not "On", i.e., when the selected bit is "Off".

(Step S72) The copy scheduler 110 determines whether or not a bit (corresponding bit) in the transfer control bit string 115 corresponding to the selected bit is "Off". The copy scheduler 110 proceeds to step S73 when the corresponding bit is "Off", or proceeds to step S75 when the corresponding bit is not "Off", i.e., when the corresponding bit is "On".

(Step S73) The copy scheduler 110 stores, in the cache 111, the data set corresponding to the selected bit in the copy source LUN. The data set stored in the cache 111 is transferred from the copy source storage apparatus 11a to the copy destination storage apparatus 11b.

(Step S74) The copy scheduler 110 turns the selected bit to "Off".

(Step S75) The copy scheduler 110 determines whether or not the end bit of the update record bit string 114 has been selected, i.e., whether or not the selected bit is the end bit of the update record bit string 114. The copy scheduler 110 proceeds to step S76 when the selected bit is not the end bit, or proceeds to step S77 when the selected bit is the end bit.

(Step S76) The copy scheduler 110 updates the selected bit by shifting the selected bit of the update record bit string 114 backward by one bit. The copy scheduler 110 proceeds to step S71 after having updated the selected bit.

(Step S77) The copy scheduler 110 terminates the first transfer-at-recovery procedure after having reset the transfer control flag.

In the first transfer-at-recovery procedure described above, the copy scheduler 110 selects, as a data set to be transferred, an area in the copy source LUN with the selected bit being "On" and the corresponding bit being "Off". In other words, the copy scheduler 110 does not select, as a data set to be transferred, an area in the copy source LUN with the selected bit being "On" and also the corresponding bit being "On". The selected bit "On" and also the corresponding bit being "On" indicates that a data set of a newer generation than the data set stored in the copy source LUN is stored in the copy source buffer region 112. Therefore, although such a data set is transferred to the copy destination storage apparatus 11b, it will be updated by transferring the data set of the newer generation. Such a duplicated transfer may result in an undesired increase in the amount of transferred data, which may cause delay of recovery. The first transfer-at-recovery procedure suppresses the amount of transferred data by avoiding such a duplicated transfer.

The data set whose transfer has been suppressed will be provided with an opportunity of transfer by the first transfer-at-recovery procedure or the second transfer-at-recovery procedure due to another exhaustion of the copy source buffer region 112.

Figure 20:
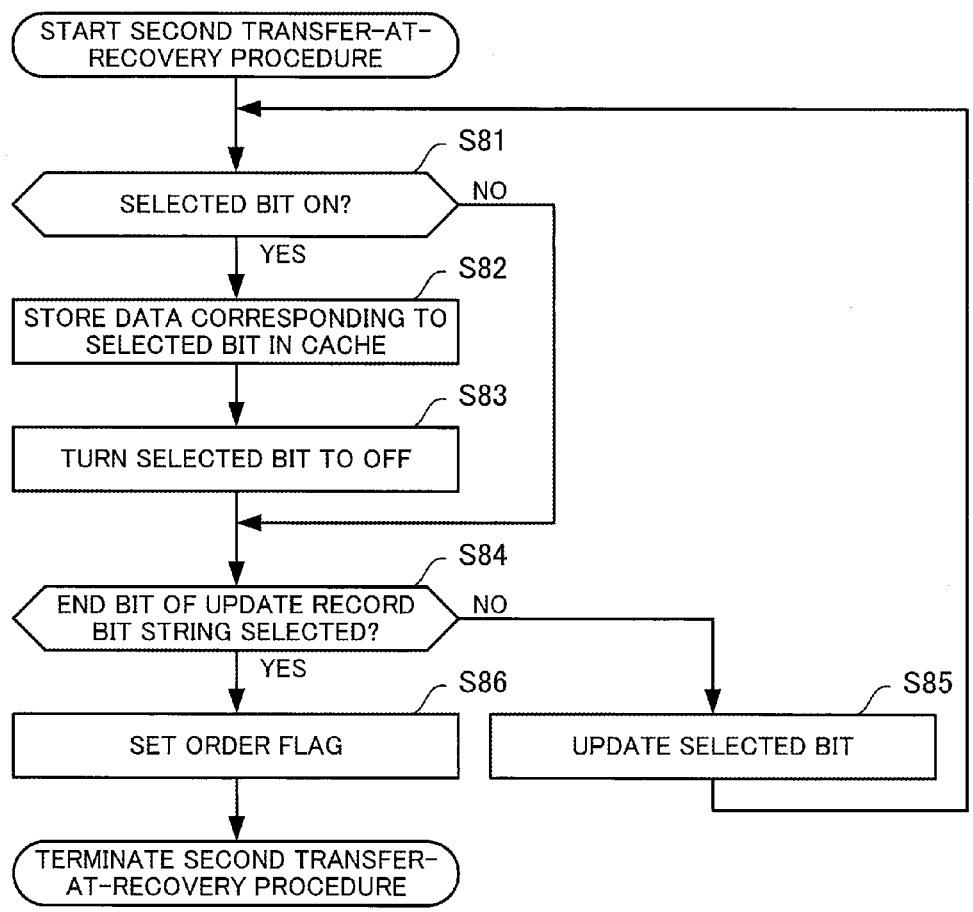
FIG. 20 illustrates a flowchart of a second transfer-at-recovery procedure of the second embodiment.

Next, the second transfer-at-recovery procedure will be described, referring to FIG. 20. FIG. 20 illustrates a flowchart of the second transfer-at-recovery procedure of the second embodiment.

The second transfer-at-recovery procedure is a process of performing data transfer from the copy source storage apparatus 11a to the copy destination storage apparatus 11b, based on the update record bit string 114. The second transfer-at-recovery procedure is a process performed by the copy scheduler 110 at step S64 of the recovery procedure.

(Step S81) The copy scheduler 110 determines whether or not the selected bit is "On". The copy scheduler 110 proceeds to step S82 when the selected bit is "On", or proceeds to step S84 when the selected bit is not "On", i.e., when the selected bit is "Off".

(Step S82) The copy scheduler 110 stores, in the cache 111, the data set corresponding to the selected bit in the copy source LUN. The data set stored in the cache 111 is transferred from the copy source storage apparatus 11a to the copy destination storage apparatus 11b.

(Step S83) The copy scheduler 110 turns the selected bit to "Off".

(Step S84) The copy scheduler 110 determines whether or not the end bit of the update record bit string 114 has been selected, i.e., whether or not the selected bit is the end bit of the update record bit string 114. The copy scheduler 110 proceeds to step S85 when the selected bit is not the end bit, or proceeds to step S86 when the selected bit is the end bit.

(Step S85) The copy scheduler 110 updates the selected bit by shifting the selected bit of the update record bit string 114 backward by one bit. The copy scheduler 110 proceeds to step S81 after having updated the selected bit.

(Step S86) The copy scheduler 110 sets the order flag. Setting of the order flag is caused by returning of the copy source storage apparatus 11a to the order-guaranteed state by completion of the data transfer based on the update record bit string 114. The copy scheduler 110 terminates the second transfer-at-recovery procedure after having set the order flag.

Figure 21:
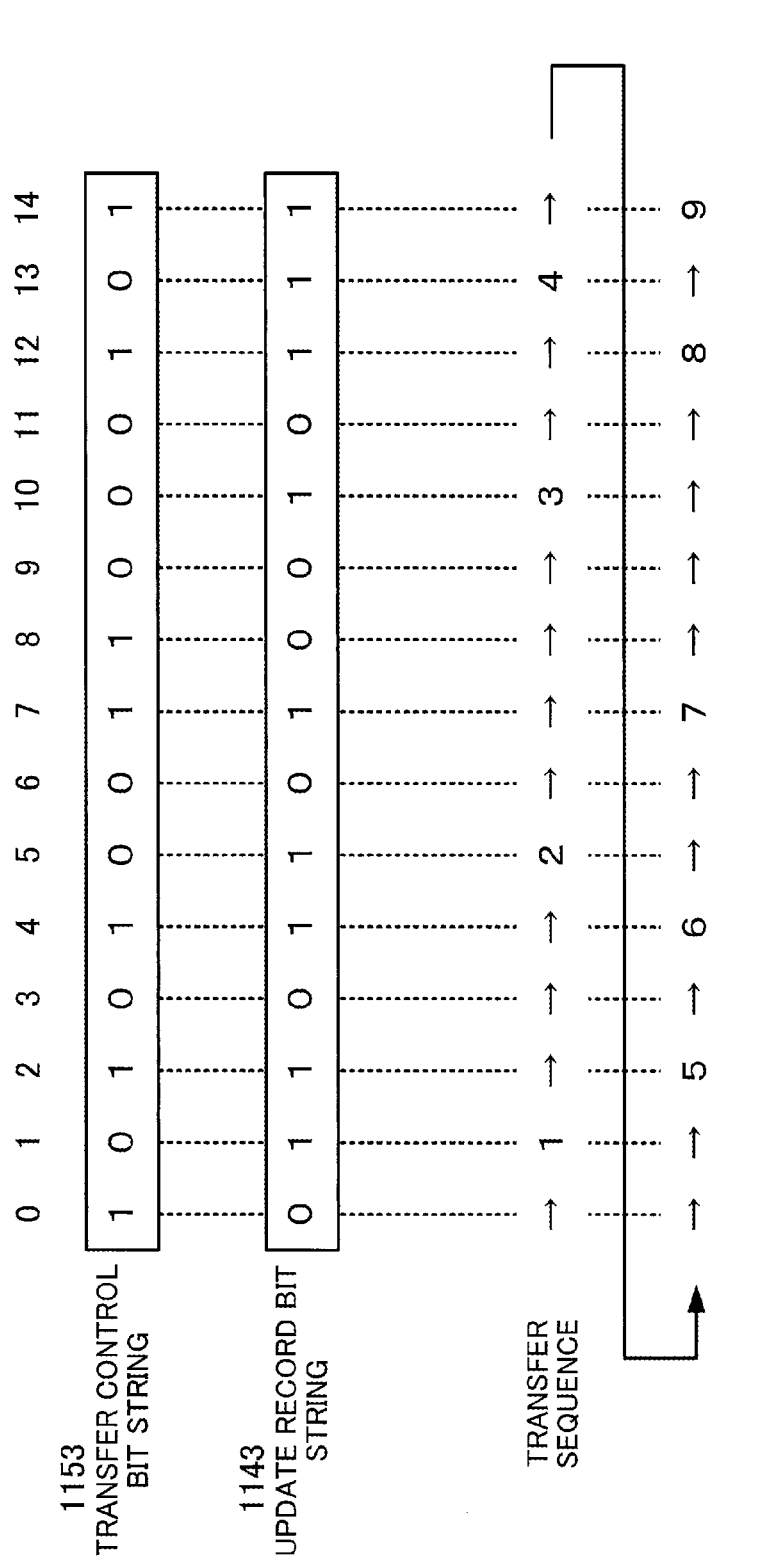
FIG. 21 illustrates an exemplary order of data transfer based on an update record bit string and a transfer control bit string of the second embodiment.

Next, the sequence of data transfer based on the update record bit string 114 and the transfer control bit string 115 will be described, referring to FIG. 21. FIG. 21 illustrates an exemplary sequence of data transfer based on an update record bit string and the transfer control bit string of the second embodiment.

An update record bit string 1143 is an example of the update record bit string 114, and a transfer control bit string 1153 is an example of the transfer control bit string 115. The update record bit string 1143 and the transfer control bit string 1153 are each assumed to be a 15-bit bit string from the 0th bit to the 14th bit.

The copy scheduler 110 uses the update record bit string 1143 and the transfer control bit string 1153 to determine the order of transfer of data sets which are stored in the copy source LUN but yet to be transferred to the copy destination storage apparatus 11b.

In the first transfer-at-recovery procedure, the copy scheduler 110 scans the update record bit string 1143 from the top to the end, and searches for a selected bit being "1" and a corresponding bit being "0". Thus, the copy scheduler 110 determines the order of transfer of the first bit to be the first, the order of transfer of the fifth bit to be the second, the order of transfer of the tenth bit to be the third, and the order of transfer of the 13th bit to be the fourth. The selected bits (first bit, fifth bit, tenth bit, and thirteenth bit) are sequentially set to "0" due to data transfer.

Having scanned the update record bit string 1143 to the end in the first transfer-at-recovery procedure, the copy scheduler 110 resets the transfer control flag, whereby execution of the first transfer-at-recovery procedure is replaced by execution of the second transfer-at-recovery procedure.

In the second transfer-at-recovery procedure, the copy scheduler 110 scans the update record bit string 1143 from the top to the end again, and searches for a selected bit being "1". Thus, the copy scheduler 110 determines the order of transfer of the second bit to be the fifth, the order of transfer of the fourth bit to be the sixth, the order of transfer of the seventh bit to be the seventh, the order of transfer of the twelfth bit to be the eighth, and the order of transfer of the fourteenth bit to be the ninth. The selected bits (second bit, fourth bit, seventh bit, twelfth bit, and fourteenth bit) are sequentially set to "0" due to data transfer.

As thus described, the copy scheduler 110 performs the data transfer based on the selected bit being "1" and the corresponding bit being "0" preferentially over the selected bit being "1" and the corresponding bit being "1". Such a priority control of the transfer sequence suppresses duplicated transfer when the transfer control bit string 1153 has been merged with the update record bit string 1143 due to re-exhaustion of the copy source buffer region 112. For example, when the order of transfer of the second bit is set to be second regardless of the transfer control bit string 1153, the second bit turns to "one" again so as to be transferred again due to re-exhaustion of the copy source buffer region 112 after having transferred the second bit. The copy scheduler 110 reduces the opportunity of duplicated transfer at the time of re-exhaustion of the copy source buffer region 112 by postponing the order of transfer of the second bit to the fifth place.

The aforementioned processing function may be realized by a computer. In such a case, there is provided a program having described therein the content of processing of the functions desired to be included in the storage control apparatus 2, the first storage apparatus 3, the second storage apparatus 4, and the storage apparatus 11. Executing the program by a computer realizes the aforementioned processing function on the computer. The program having described therein the content of processing may be stored in a computer-readable storage medium. There may be used, as a computer-readable storage medium, a magnetic storage apparatus, an optical disk, a magneto-optical storage media, a semiconductor memory, or the like. There may be used, as a magnetic memory device, a hard disk drive (HDD), a flexible disk (FD), a magnetic tape, or the like. There may be used, as an optical disk, a DVD, a DVD-RAM, a CD-ROM/RW, or the like. There may be used, as a magneto-optical storage medium, an MO (Magneto-Optical disk), or the like.

When distributing a program, a portable storage medium such as, for example, a DVD or a CD-ROM having the program stored thereon is put in the market. In addition, the program may also be stored in the storage apparatus of a server computer and transferred from the server computer to other computers via a network.

A computer expected to execute a program stores, in its local storage apparatus, the program stored on a portable storage medium or transferred from a server computer, for example. The computer then reads the program from its local storage apparatus and performs processing according to the program. The computer may also read the program directly from the portable storage medium and perform processing according to the program. In addition, the computer may also sequentially perform processing, each time a program is transferred from a server computer connected via a network, according to the received program.

In addition, at least a part of the aforementioned processing function may be implemented by an electronic circuit such as a DSP, an ASIC, a PLD, or the like.

According to an aspect, a storage control apparatus, a copy control program, and a copy control method make it possible to return more quickly from an order-unguaranteed state in remote copy to an order-guaranteed state.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
a memory having a buffer region that stores, for each update generation, a data set for updating a copy source volume included in a first storage apparatus being a copy source; and
a processor that performs a procedure including:
storing, upon receiving a data set for updating the copy source volume, the data set in the buffer region, and storing, in the memory, correspondence relation information indicating a correspondence relation between a position where the data set is to be stored in the copy source volume and a position where the data set is stored in the buffer region; and
when transferring a data set from the first storage apparatus to a second storage apparatus being a copy destination, selecting a data set of an old update generation to be transferred among data sets stored in the buffer region, updating the copy source volume with the data set of the old update generation, deleting the data set of the old update generation from the buffer region, and also deleting correspondence relation information corresponding to the data set of the old update generation from the memory; and
when a capacity of the buffer region runs short, creating and storing in the memory, update record information indicating whether an update has been made for each predetermined area in the copy source volume based on a predetermined data set of an old update generation that is older than any other data set stored in the buffer region, updating the copy source volume with the predetermined data set of the old update generation according to the correspondence relation information, deleting the predetermined data set of the old update generation from the buffer region, also deleting correspondence relation information corresponding to the predetermined data set of the old update generation from the memory, and transferring the predetermined data set of the old update generation stored in the copy source volume to the second storage apparatus, based on the update record information.

2. The storage control apparatus according to claim 1, wherein the procedure further includes creating and storing in the memory, update record information based on a data set to be deleted from the buffer region as update record information for transfer control, when the capacity of the buffer region is still short after the predetermined data set of the old update generation is deleted from the buffer region.

3. The storage control apparatus according to claim 2, wherein the procedure further includes reflecting the update record information for transfer control in the update record information, when the capacity of the buffer region runs short in a state in which an order of remote copy is not guaranteed.

4. The storage control apparatus according to claim 3, wherein each of the update record information and the update record information for transfer control is bits each indicating whether an update has been made to a predetermined area in the copy source volume.

5. The storage control apparatus according to claim 3, wherein the state in which the order of remote copy is not guaranteed is a state in which none of bits of the update record information for transfer control corresponding to bits of the update record information each indicating that an update has been made to a predetermined area in the copy source volume indicates that an update has not been made to a predetermined area in the copy source volume.

6. The storage control apparatus according to claim 1, wherein the procedure further includes referring to the correspondence relation information upon receiving a request for reading out a data set from the copy source volume, acquiring the requested data set from the buffer region and returning the requested data set when the buffer region stores the requested data set, or acquiring the requested data set from the copy source volume and returning the requested data set when the buffer region does not store the requested data set.

7. A non-transitory computer-readable storage medium storing a computer program that causes a computer to perform a procedure comprising:
   storing, upon receiving a data set for updating a copy source volume included in a first storage apparatus being a copy source, the data set in a buffer region provided in a memory for each update generation, and storing, in the memory, correspondence relation information indicating a correspondence relation between a position where the data set is to be stored in the copy source volume and a position where the data set is stored in the buffer region; and
   when transferring a data set from the first storage apparatus to a second storage apparatus being a copy destination, selecting a data set of an old update generation to be transferred among data sets stored in the buffer region, updating the copy source volume with the data set of the old update generation, deleting the data set of the old update generation from the buffer region, and also deleting correspondence relation information corresponding to the data set of the old update generation from the memory; and
   when a capacity of the buffer region runs short, creating and storing in the memory, update record information indicating whether an update has been made for each predetermined area in the copy source volume based on a predetermined data set of an old update generation that is older than any other data set stored in the buffer region, updating the copy source volume with the predetermined data set of the old update generation according to the correspondence relation information, deleting the predetermined data set of the old update generation from the buffer region, also deleting correspondence relation information corresponding to the predetermined data set of the old update generation from the memory, and transferring the predetermined data set of the old update generation stored in the copy source volume to the second storage apparatus, based on the update record information.

8. A copy control method comprising:
   storing, by a computer, upon receiving a data set for updating a copy source volume included in a first storage apparatus being a copy source, the data set in a buffer region provided in a memory for each update generation, and storing, in the memory, correspondence relation information indicating a correspondence relation between a position where the data set is to be stored in the copy source volume and a position where the data set is stored in the buffer region;
   when transferring a data set from the first storage apparatus to a second storage apparatus being a copy destination, selecting, by the computer, a data set of an old update generation to be transferred among data sets stored in the buffer region, updating the copy source volume with the data set of the old update generation, deleting the data set of the old update generation from the buffer region, and also deleting correspondence relation information corresponding to the data set of the old update generation from the memory; and
   when a capacity of the buffer region runs short, creating and storing in the memory, by the computer, update record information indicating whether an update has been made for each predetermined area in the copy source volume based on a predetermined data set of an old update generation that is older than any other data set stored in the buffer region, updating the copy source volume with the predetermined data set of the old update generation according to the correspondence relation information, deleting the predetermined data set of the old update generation from the buffer region, also deleting correspondence relation information corresponding to the predetermined data set of the old update generation from the memory, and transferring the predetermined data set of the old update generation stored in the copy source volume to the second storage apparatus, based on the update record information.

* * * * *